United States Patent
Walsh

(10) Patent No.: US 9,598,862 B2
(45) Date of Patent: Mar. 21, 2017

(54) RESETTING SEMI-PASSIVE STIFFNESS DAMPER AND METHODS OF USE THEREOF

(71) Applicant: Ohio University, Athens, OH (US)

(72) Inventor: Kenneth K. Walsh, Athens, OH (US)

(73) Assignee: Ohio University, Athens, OH (US)

( * ) Notice: Subject to any disclaimer, the term of this patent is extended or adjusted under 35 U.S.C. 154(b) by 257 days.

(21) Appl. No.: 14/106,185

(22) Filed: Dec. 13, 2013

(65) Prior Publication Data

US 2014/0196995 A1 Jul. 17, 2014

Related U.S. Application Data

(60) Provisional application No. 61/737,211, filed on Dec. 14, 2012.

(51) Int. Cl.
| | |
|---|---|
| *F16D 57/00* | (2006.01) |
| *E04B 1/98* | (2006.01) |
| *F16F 9/512* | (2006.01) |
| *F16F 9/32* | (2006.01) |
| *F16F 15/02* | (2006.01) |

(Continued)

(52) U.S. Cl.
CPC ............ *E04B 1/98* (2013.01); *F16F 9/3292* (2013.01); *F16F 9/512* (2013.01); *F16F 15/02* (2013.01); *E04H 2009/026* (2013.01)

(58) Field of Classification Search
CPC ...... F16F 9/20; F16F 9/46; F16F 9/103; F16F 9/325; F16F 9/3292; F16F 9/3207; F16F 9/512; F16F 15/02; F16F 15/022; F16F 15/023; F16F 2230/08; F16F 2232/08; B60G 17/08; B60G 2202/24; B60G 2202/154; B60G 2202/413; B60G 2202/414; B60G 2202/415; B60G 2500/114; E04H 2009/026; E04B 1/98

See application file for complete search history.

(56) References Cited

U.S. PATENT DOCUMENTS

| | | | | |
|---|---|---|---|---|
| 1,812,051 A | * | 6/1931 | Knight ................. | F16F 9/20 188/282.9 |
| 2,890,064 A | * | 6/1959 | Hudson .............. | B60G 17/0162 180/428 |

(Continued)

FOREIGN PATENT DOCUMENTS

DE 19755375 A1 * 6/1998

*Primary Examiner* — Melody Burch
(74) *Attorney, Agent, or Firm* — Standley Law Group LLP

(57) ABSTRACT

A resetting semi-passive stiffness damper (RSPSD) for use in damping movement. Embodiments of such a RSPSD include, for example, a pistoned cylinder connected to a grooved rack, and a spring-loaded lever arranged between the rack and a slotted channel above the rack. One end of the lever is allowed to move pivotably and vertically within the channel as the other end moves with the rack. A sensor is provided and communicates with a bypass valve on the cylinder. A change in the direction of movement of the rack forces the lever further into the slotted channel where it eventually triggers the sensor, which then sends a signal to open the bypass valve. As the rack continues to move, the lever eventually reverses direction, and is forced back down the slotted channel by a return spring. Upon leaving the sensing range of the sensor, the valve is signaled to close.

18 Claims, 20 Drawing Sheets

(51) Int. Cl.
*F16D 7/10* (2006.01)
*E04H 9/02* (2006.01)

(56) References Cited

U.S. PATENT DOCUMENTS

| | | | | |
|---|---|---|---|---|
| 4,779,512 A | * | 10/1988 | Leonard | B60G 21/0555 |
| | | | | 137/625.69 |
| 5,595,372 A | | 1/1997 | Patten | |
| 5,984,062 A | | 11/1999 | Bobrow et al. | |
| 2004/0020355 A1 | | 2/2004 | Shih | |
| 2005/0016086 A1 | * | 1/2005 | Matsunaga | B60G 17/0152 |
| | | | | 52/167.1 |
| 2006/0208446 A1 | * | 9/2006 | Runkel | B60G 3/14 |
| | | | | 280/124.128 |
| 2010/0019425 A1 | | 1/2010 | Iemura et al. | |
| 2010/0117277 A1 | * | 5/2010 | Ohta | B60G 13/18 |
| | | | | 267/140.14 |

* cited by examiner

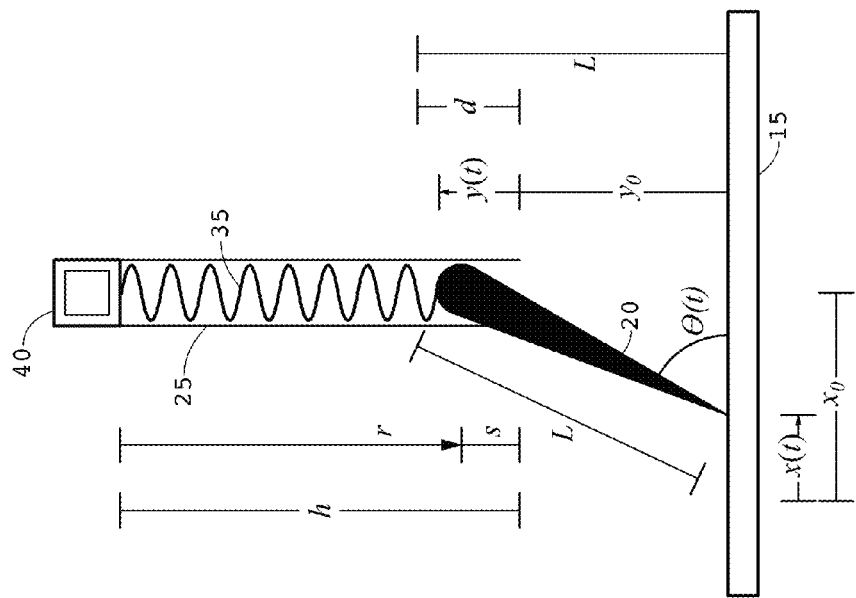
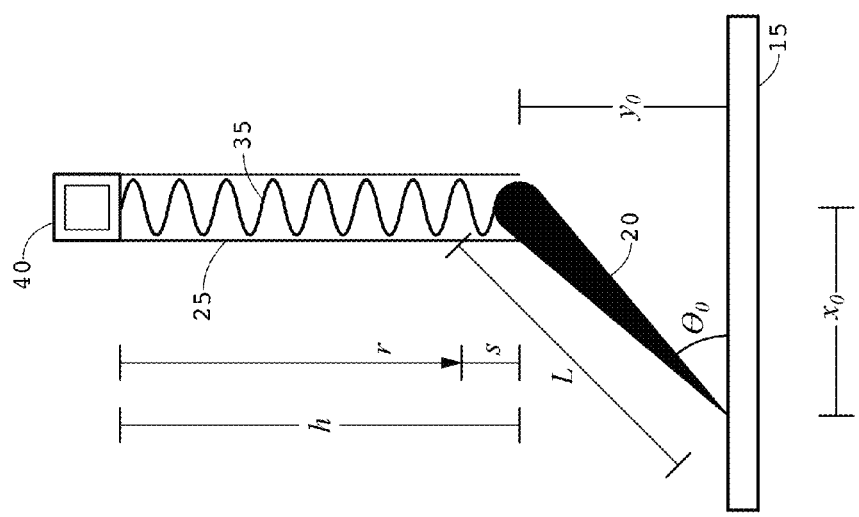
FIG. 3A
FIG. 3B

TABLE 1. COMPARISON OF HYSTERETIC CHARACTERISTICS FOR RSPSD AND RSASD

| PERIOD (s) | RSASD $E$ (kN-mm) | | | RSPSD | | |
|---|---|---|---|---|---|---|
| | | $E$ (kN-mm) | | | $t_s$ (ms) | |
| | | s = 2mm | s = 6mm | | s = 2mm | s = 6mm |
| (1) | (2) | (3) | (4) | | (5) | (6) |
| 0.6 | 5.62E+06 | 3.47E+06 | 3.49E+06 | | 66 | 17 |
| 1.8 | 1.82E+06 | 1.12E+06 | 1.12E+06 | | 198 | 53 |
| 5.4 | 5.53E+06 | 3.53E+05 | 3.43E+05 | | 597 | 161 |

FIG. 7

TABLE 2. COMPARISON OF PEAK RESPONSE QUANTITIES FOR RSPSD AND RSASD

| PERIOD (s) | $x_{PEAK}$ (mm) | | | | $a_{PEAK}$ (g) | | | |
| --- | --- | --- | --- | --- | --- | --- | --- | --- |
| | NONE | RSPSD s = 2mm | RSPSD s = 6mm | RSASD | NONE | RSPSD s = 2mm | RSPSD s = 6mm | RSASD |
| (1) | (2) | (3) | (4) | (5) | (6) | (7) | (8) | (9) |
| 0.6 | 0.12 | 0.07 | 0.07 | 0.05 | 1.38 | 1.77 | 1.90 | 1.46 |
| 1.8 | 0.57 | 0.10 | 0.08 | 0.08 | 0.71 | 1.18 | 1.36 | 1.08 |
| 5.4 | 0.52 | 0.12 | 0.08 | 0.08 | 0.07 | 1.12 | 1.30 | 1.05 |

FIG. 11

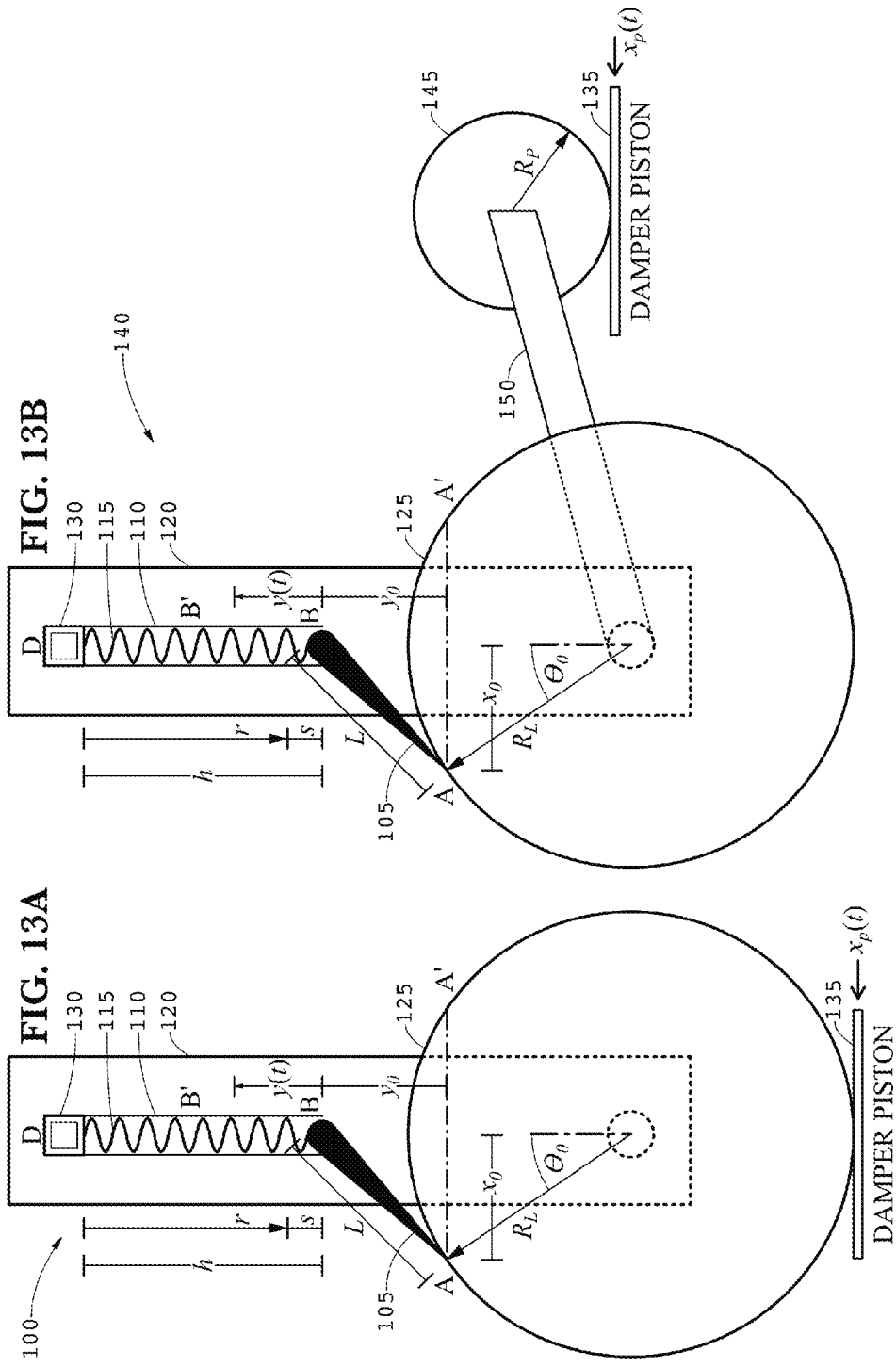

RESETTING SEMI-PASSIVE STIFFNESS DAMPER AND METHODS OF USE THEREOF

STATEMENT REGARDING FEDERALLY SPONSORED RESEARCH OR DEVELOPMENT

This invention was made with government support under grant No. 1235373 awarded by the National Science Foundation. The government has certain rights in the invention.

CROSS-REFERENCE TO RELATED APPLICATIONS

This application claims the benefit of U.S. Provisional Application No. 61/737,211 filed on Dec. 14, 2012.

TECHNICAL FIELD

The present invention is directed to stiffness dampers, systems comprised of such stiffness dampers, and methods of use thereof.

BACKGROUND

Stiffness dampers of various design and size are known. Stiffness dampers relevant to the invention are generally designed and used to damp movement. One such type of movement is the movement of structures during an earthquake.

Throughout history earthquakes have had a devastating impact on society, often resulting in significant economic losses and loss of life. According to the CATDAT Damaging Earthquakes Database, earthquakes caused global economic losses exceeding $500 billion as well as an estimated 20,000 fatalities. The Federal Emergency Management Agency (FEMA) estimates that the minimum average cost of earthquakes to the United States is $5 billion per year. However, a single large earthquake may cost far more than the average annual estimate. For example, the 1994 Northridge, Calif. earthquake alone caused as much as $26 billion, and it is predicted that another large earthquake along the San Andreas Fault in southern California could result in 1,800 fatalities and more than $200 billion in losses.

One way to reduce losses caused by earthquakes is to minimize the vulnerability of civil infrastructure. This can be achieved through infrastructure strengthening and/or the implementation of structural control.

Structural control is of interest here. Structural control can be broadly characterized as active, passive, or semi-active, depending on the hardware requirements. A significant amount of research has been conducted in each category, and widespread application of structural control devices has been achieved. Of the three control types, semi-active control has recently received increased attention due to its adaptability, minimal power requirement, and inherent stability. As a result, several new and innovative semi-active control devices have emerged. One of these, the resetting semi-active stiffness damper (RSASD), has proven effective in reducing the response of structures in the presence of near-field ground motions. This is particularly important, as this type of ground motion is characterized by high peak acceleration and high velocity pulse with long period, and is responsible for the destruction and severe damage to civil infrastructure.

An RSASD generally consists of a piston, a double-acting cylinder filled with compressed air or hydraulic fluid, and a bypass loop with a valve (see FIG. 1a). The cylinder is divided into two chambers by the piston head, and the chambers are connected by the bypass loop. When the bypass valve is closed, the fluid in the cylinder is compressed due to the action of the piston. When the valve is opened, energy stored in the fluid as a result of compression is turned into heat and dissipated. Therefore, for an RSASD installed in a structure, as shown in FIG. 1b, the RSASD adds stiffness to the structure when the valve is closed, and removes stiffness from the structure when the valve is opened.

The ability of a RSASD to add and remove stiffness from a structure correlates to an ability to store and then dissipate mechanical energy. Therefore, the RSASD is capable of extracting mechanical energy from a structure by opening and closing the valve at appropriate time instants. From this basic concept, a resetting mode concept emerged with the aim to maximize the amount of mechanical energy that is dissipated by a RSASD during a given cycle of motion. In the resetting mode, the valve remains closed until drift velocity equals zero, at which time the valve is pulsed open and closed, effectively resetting the stiffness of the device. As a result, a RSASD is always storing mechanical energy from the structure to which it is connected, and only dissipates energy when a maximum amount of energy storage has been reached.

Implementation of the resetting mode concept described above requires the use of feedback components such as encoders for determining piston position, a microcontroller for detecting a change in direction of piston movement, an electric servo-valve for regulating fluid flow, and a small power source for operating these components. One advantage of this resetting mode concept is that it may be implemented based on local information about each RSASD piston position, and does not require knowledge of the structure response at other locations (i.e., it is decentralized control logic).

Another advantage is that the control logic is response dependent, and therefore does not need to rely on accurate information about structural properties which may be estimated incorrectly or change over time. Yet another advantage of the RSASD is the displacement dependent nature of the control force delivered to the structure thereby. This is particularly important for structures subject to near-field earthquakes characterized by high velocity pulses where forces from velocity-dependent devices can often exceed control device capacity, may require excessively large bracing systems for the devices, and can adversely affect the response of the structure. Displacement-dependent control devices such as RSASDs are not susceptible to these effects, and are therefore well-suited for controlling the response of structures subject to near-field motions.

In addition to the aforementioned advantages, structural control systems using RSASDs are simple, reliable, and relatively inexpensive relative to other semi-active control systems. This can be attributed to the construction of the device, which is based on minor external modifications to existing pneumatic or hydraulic damper technology that is well-developed and readily available.

Typical of semi-active control technologies, a RSASD also has several complexities associated with its operation. First, the control law for a RSASD requires that stiffness be removed from an associated structure when it has reached maximum displacement, or zero velocity. This is achieved through a feedback control system consisting of a sensor, microcontroller, and a small actuator to control the valve. As a result, the feedback control system is disproportionately complex relative to the feedback law.

Furthermore, the feedback control system is designed such that the valve is pulsed open and closed when the piston has reached its maximum displacement, i.e., when there is a change in sign of the piston velocity. However, this means that any noise (interference) in the sensor signal, or any high frequency small amplitude structural vibrations, could also trigger the valve, thereby resetting the device at the wrong time. To prevent this, a deadband and a threshold on the position signal must be used. The threshold is used to ensure that a predetermined minimum piston displacement has occurred before resetting the device. The deadband eliminates resetting of the device based on localized peaks in the position signal that do not correspond with the maximum position of the piston.

As a result of the threshold, resetting only occurs after the piston has moved some minimum distance. As a result of the deadband, the valve is triggered a short time after the actual maximum displacement of the piston has occurred.

It can be understood from the foregoing commentary that, while RSASDs have advantages when used for structural control, there is nonetheless a need for a simpler device that provides similar results. Embodiments of the invention satisfy this need.

SUMMARY

Proposed herein is a less complicated stiffness damper device and systems and methods of using such a damper device for structural control and possibly for other damping applications. More particularly, the invention includes various embodiments of a resetting semi-passive stiffness damper (RSPSD), which is an innovative yet simple mechanism that can replace the feedback system in the RSASD device while achieving the same or a similar control effect.

The issue of noise in the RSASD feedback control system sensor is eliminated in the case of a RSPSD. Threshold and deadband are inherent in the RSPSD design, but may be controlled to eliminate unwanted resetting due to low level structural vibrations and local peaks. As a RSPSD does not rely on a feedback system, a RSPSD is more reliable and less expensive than a RSASD. A more reliable device at a reduce cost that provides the same control effect will translate to increased acceptability in the structural controls community, and make this technology more attractive to structure owners.

An exemplary embodiment of a proposed RSPSD is schematically represented in FIG. 2. As shown, a piston is connected in series with a grooved rack. A spring-loaded triggering lever is arranged in a slotted channel above the rack. The lever is allowed to move vertically and to rotate about the end in the channel slot. The other end of the lever rests on the grooves in the rack. A proximity sensor communicates with a bypass valve on the cylinder.

Once the system is set in motion, the vertical position of the lever remains unaffected until the rack changes direction, at which time the end of the lever resting between the grooves on the rack is engaged. Upon engagement, further movement of the rack forces the lever to rotate while simultaneously driving it vertically in the slotted channel. When the lever reaches a predetermined position, it triggers the proximity sensor, which then sends a signal to open the bypass valve. As the rack continues to move, the lever reaches its maximum vertical position, reverses direction, and is then forced back down the slotted channel by a return spring. Once the lever leaves the proximity of the sensor, the valve closes. With the lever resting on the rack now oriented in the opposite position, the process is repeated when movement of the rack next changes direction.

It can be understood from the foregoing description of an exemplary RSPSD that during operation thereof, the valve is pulsed open and closed each time the piston changes direction, thereby permitting energy to be extracted from a vibrating structure. Furthermore, the only sensor used is a proximity sensor that sends a set voltage to the bypass valve while the lever is within a certain range. Consequently, the complexity of the earlier described known RSASDs is eliminated.

In an alternate embodiment, a RSPSD could be modified to manually open and close the valve based on the position of the lever in the slotted channel. In such an embodiment, all of the electrical components inherent to a typical RSASD could be removed, such that the resulting device would actually function as a resetting passive stiffness damper (RPSD). The RPSD would be a completely passive control technology.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIGS. 3a-3b schematically illustrate the position and movement of a lever element of an exemplary RSPSD of the invention before and after displacement of an associated rack element;

FIG. 7 is a table comparing the hysteretic characteristics of an exemplary RSPSD to an exemplary RSASD;

FIG. 11 numerically presents the peak response data associated with the aforementioned exemplary RSPSD and RSASD during the simulation;

FIGS. 13a-13b schematically and respectively illustrate further alternative embodiments of amplified and non-amplified triggering lever assemblies that may be used with a RSPSD of the invention;

FIG. 14 graphically compares the vertical displacement of the lever in the channel versus the horizontal displacement of the damper piston for the configurations shown in FIG. 2, FIG. 12a, and FIG. 13a;

DETAILED DESCRIPTION OF EXEMPLARY EMBODIMENT(S)

Figures 1A, 1B:
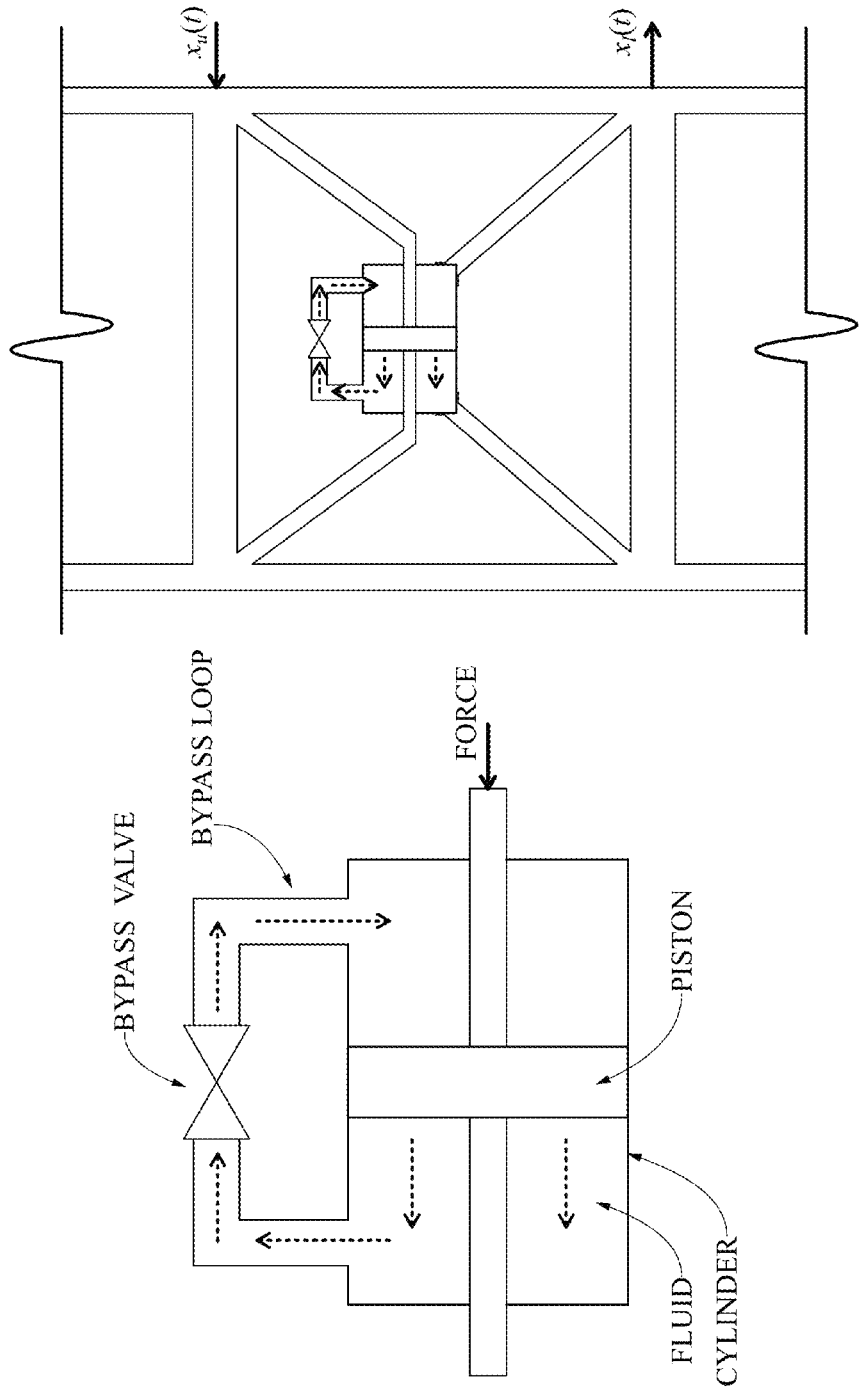
FIG. 1a schematically represents the construction of a typical RSASD.
FIG. 1b depicts the RSASD of FIG. 1a installed in a structure.

Referring again to FIG. 2 and to FIG. 3a, it can be understood that an exemplary embodiment of a RSPSD 5 according to the invention will generally include a piston-containing cylinder 10 that is connected in series with a grooved rack 15. A triggering lever 20, with a length (L), has one end arranged in a slotted channel 25 at a distance ($y_0$) above the rack 15. The channel may be associated with a vertical column 30, etc. The lever 20 is biased downward by a spring 35 located in the channel 25.

The lever 20 is allowed to move vertically within the channel 25 and to rotate about the end thereof that resides in the channel. The opposite end of the lever 20 rests on the grooves in the rack 15, at a transverse distance ($x_0$) from the slotted channel 25 and at an initial orientation of ($\theta_0$) with respect to the rack. A sensor 40, such as a proximity sensor, having a range (r) is located near the end of the channel 25 farthest from the rack 15, and at a distance (h) above the end of the lever that resides in the channel. The lever 20 must travel a selected distance (s) to be within the sensing range of the proximity sensor 40. The proximity sensor 40 communicates with a bypass valve 45 on the cylinder 10.

Referring now to FIGS. 3a-3b, movement of the lever 20 and operation of the RSPSD 5 can be better understood. As shown in FIG. 3a, the rack 15 is initially moving to the left. As long as the rack 15 continues to move in the initial direction, the vertical position of the lever 20 remains unaffected. However, as illustrated in FIG. 3b, when the direction of movement of the rack 15 reverses (as indicated by the arrow), the rack-contacting end of the lever 20 becomes engaged with the grooves of the rack 15. Upon engagement, further movement of the rack 15 in the new direction forces the lever 20 to rotate while simultaneously driving the lever into the slotted channel 25 by some associated distance (y(t)). Vertical movement of the lever also causes a transverse movement of the rack-contacting end thereof, the distance of movement being indicated by (x(t)). The total vertical distance the lever 20 travels is denoted by (d). Using trigonometry, the vertical distance (y(t)) the lever travels as a function of the movement (x(t)) of the rack can be expressed as:

$$y(t)=\sqrt{L^2-[x_0-x(t)]^2}-(L-D) \qquad (1)$$

where (y(t)) is valid for $0<x(t)<2\cdot(x_0)$.

When the lever 20 reaches a predetermined position, it triggers the proximity sensor 40, which then sends a signal to open the bypass valve 45. As the rack 15 continues to move, the lever 20 reaches its maximum vertical position, reverses direction, and is then forced by the return spring 35 back along the channel 25 in a reverse direction. Once the lever 20 leaves the sensing range (r) of the proximity sensor 40, the valve 45 closes. With the rack-contacting end of the lever 20 now oriented in the opposite direction on the rack 15, the above-described movement of the lever and the associated process is repeated when movement of the rack next changes direction.

Figure 4B:
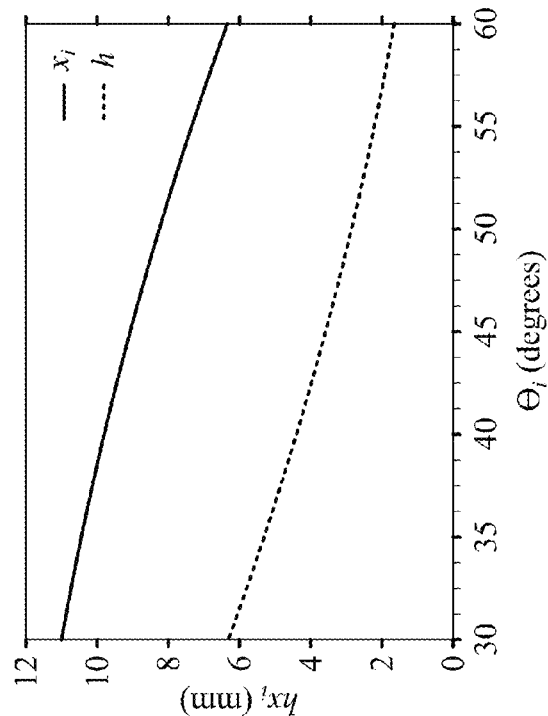
FIG. 4b graphically illustrates certain design parameters associated with the lever element.
Figure 4A:
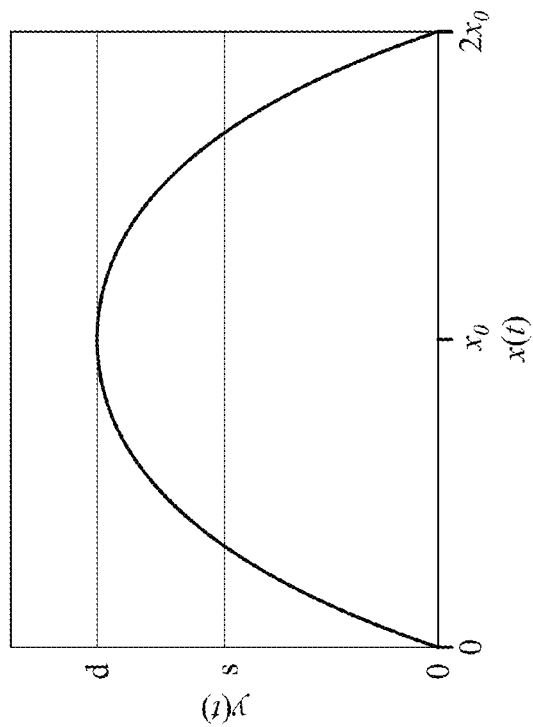
FIG. 4a graphically illustrates displacement of the lever element during movement of the rack element.

A plot of ($y_t$) for $0<x(t)<2\cdot(x_0)$ is provided in FIG. 4a. Included on the y-axis of the plot are the distance (s) the lever 20 must travel to be within the range (r) of the proximity sensor 40, and the total travel distance (d). For $y(t)<s$, the lever 20 is engaged but is not within the range of the sensor 40, and the valve 45 on the RSPSD will remain closed. Once $(s) \le y(t) < (d)$, an electrical signal is sent to the valve 45 and it opens, the pressure in the RSPSD equalizes, and the damper force drops to zero. The valve 45 remains open as the lever 20 reaches (d), changes direction, and begins to move back down the channel 25. Once the lever 20 has moved out of range (r) of the sensor 40 y(t)<s, the voltage drops to zero and the valve 45 closes again. Thus, pressure equalization in the device takes place while $0<x(t)<2\cdot x_0$ and $(s) \le y(t) < (d)$, a condition which was used to model resetting of the device 5 in various numerical simulations.

It is desirable that RSPSDs according of the invention perform similarly to RSASDs, but using less feedback control components so as to simplify device operation and increase reliability. An ideal RSPSD would be able to achieve instantaneous resetting of the control force with each change in direction of the rack. In other words, the valve would open, the force would drop to zero, and the valve would close again at the instant the piston velocity is zero. This operation would guarantee maximum energy dissipation by the RSPSD. Comparable performance is not achievable using a RSASD due to delays in the signal, control logic, and valve operation. In a RSPSD, this is not possible primarily due to limitations of the mechanical components. That is, there is a delay associated with the time it takes the lever to engage and begin moving vertically toward the sensor. This delay is represented by the bottom left hand portion of the curve in FIG. 4a. During this time, the piston has already changed direction, and energy stored in the device is momentarily being transferred back to the structure in which it is installed.

There is a second delay associated with a RSPSD that also prohibits it from achieving ideal performance. More specifically, once the valve is open and the pressure equalizes, the valve will remain open until the lever leaves the sensing range of the proximity sensor, i.e., y(t)<s. This is represented by the top portion of the curve in FIG. 4a. During this time, the stiffness in the device is zero and energy from the structure isn't being stored. The combined time it takes the lever to reach the sensor and then leave the sensor will hereafter be referred to as the "resetting delay" of the device.

Delays due to signal travel time and valve opening/closing are incorporated in the top portion of the curve in FIG. 4a.

In order for a RSPSD to perform similar to a RSASD, both of the RSPSD delays described above should be minimized through the design of the rack-lever mechanism. This can be achieved by reducing the corresponding portions of the curve in FIG. 4a, that is, by reducing (d), ($x_0$), and (s-d). The sensing distance (s) is determined by the location (h) and range (r) of the proximity sensor, while the distances (d) and ($x_0$) depend on the length (L) and initial orientation ($\theta_0$) of the lever. As proximity sensors come in a variety of standard ranges (e.g., 2 mm-12 mm), and the height of the sensor above the lever is easily controlled, the primary design considerations are the lever length (L) and initial orientation ($\theta_0$). FIG. 4b shows the change in (d) and ($x_0$) for $30° < (\theta_0) < 60°$ and (L)=25.4 mm (1 in), and it is apparent that both design parameters decrease with increasing ($\theta_0$).

Further decreases in (d) and ($x_0$) can be achieved by reducing the length of the lever (L). Therefore, the rack-lever mechanism can be design to reduce the resetting delay through the selection of design parameters (L), ($\theta_0$), (h), and (r). However, consideration must also be given to the practical limits on the minimum size of the rack-lever mechanism components and the minimum time required for pressure equalization of the device. Previous research has shown the time for pressure equalization to be in the range of approximately 20-40 ms for pneumatic valves.

Simulation

In order to demonstrate the feasibility of the rack-lever mechanism and to validate Equation (1), simulations were conducted in Solid Edge, a commercial software package that combines CAD and finite element analysis to aid in the design of complex systems. The rack-lever model consisted of a lever with a length (L)=70 mm (~2.75 in) and ($\theta_0$)=41°, resulting in a value of (d)=24.24 mm (~1 in) and ($x_0$)=53 mm (~2 in). The rack was driven through a sinusoidal displacement having an amplitude ±150 mm (±6 in) and a frequency of 0.25 Hz, as is shown in FIG. 5a. The vertical displacement of the lever was recorded for analysis. The same system was simulated in Matlab using Equation (1), and the results are presented along with those from Solid Edge in FIG. 5b.

Figure 5B:
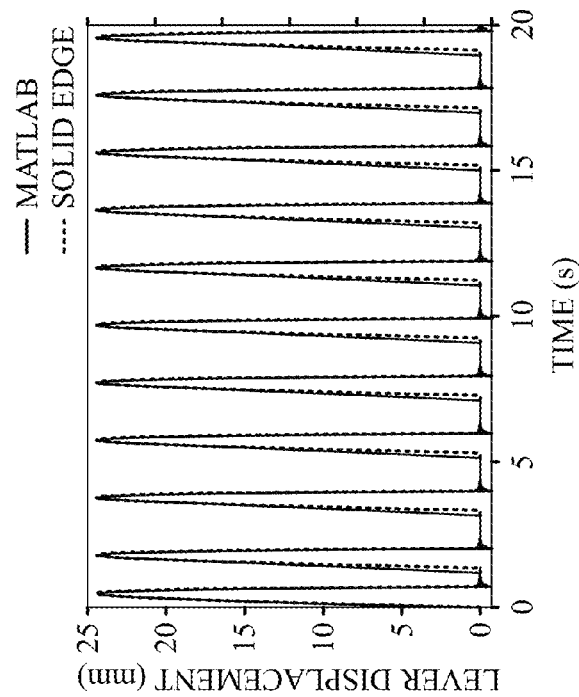
FIGS. 5a-5b graphically represent the movement of a rack element and lever element, respectively, during testing of an exemplary RSPSD.
Figure 5A:
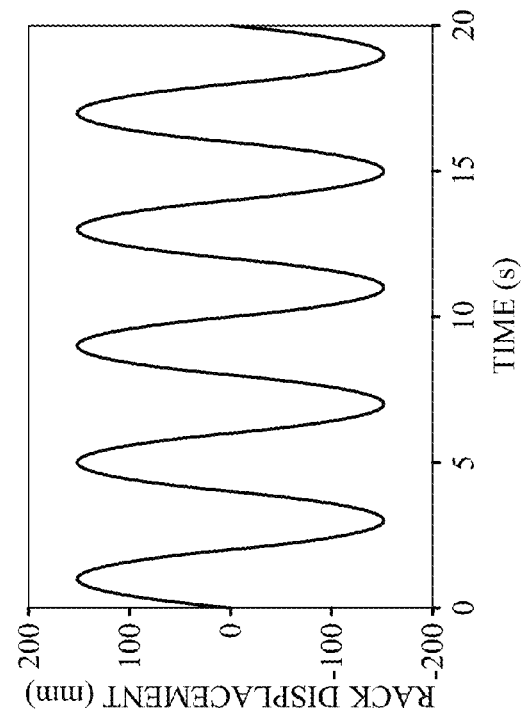

FIGS. 5a-5b demonstrate that each time the rack changes direction (reaches its maximum positive or negative displacement) the lever is engaged and driven vertically to its maximum displacement. The extra "hump" at the beginning of the Solid Edge curve is due to a combination of the initial orientation of the lever and motion of the rack, resulting in an immediate engagement and vertical (with respect to the drawings herein) displacement of the lever. For the Matlab simulation, it was assumed that the rack moved so that the lever wasn't engaged until the first change in rack direction. In practice, this initial 'hump' would cause the RSPSD to reset at the start of the structure motion. However, no energy is stored in the device at this time, and it is expected that this feature would have little effect on the overall RSPSD performance.

Another observation of FIG. 5b is the small amplitude oscillations of the lever present in the Solid Edge curve as the lever returns to the zero displacement position. These oscillations are attributed to the force from the return spring acting on the lever (see FIG. 2), and damp out over a short period of time. Although the amplitude of these vibrations is small, they could potentially cause unwanted resetting of the device. This can be avoided by designing the sensing distance (s) to be greater than the maximum amplitude of the oscillation, or incorporating a small amount of additional damping in the system. Despite small differences between the two curves, FIG. 5b demonstrates that Equation (1) accurately models the general motion of the rack-lever system.

Hysteresis

Resettable stiffness devices work by storing and dissipating energy from a vibrating structure. The maximum energy dissipated in one cycle of motion is achieved by resetting the device at the instant the piston velocity equals zero—although as previously mentioned, this ideal performance is not achievable in practice due to delays in the resetting operation.

The energy dissipation capacity of a resettable device is characterized by the area under its hysteresis curve. To demonstrate the capacity of the RSPSD, simulations were conducted in Matlab based on the setup shown in FIG. 2. In order to reduce the resetting delay while considering practical limitations on the minimum dimensions of the mechanism components, a lever length of (L)=12.7 mm (0.5 in) with initial orientation ($\theta_0$)=30° was used. The resulting values of ($x_0$) and (d) were 11 mm (~0.5 in) and 6.35 mm (0.25 in) respectively. The height and range of the proximity sensor were varied to yield (s)=2 mm and (s)=6 mm, in order to demonstrate the effect of (s) on the RSPSD performance. The effective stiffness of the pneumatic damper is assumed to be $k_d$=32.89 kN/mm. For comparison, a hysteresis curve for an ideal RSASD was also computed. For all simulations, the piston of the device was driven through a sinusoidal displacement having an amplitude of ±50.8 mm (±2 in) and periods of 0.6 s, 1.8 s, and 5.4 s. The hysteresis curves for the RSPSD for T=0.6 s and the two different values of (s) are presented in FIGS. 6a-6b, along with the curve for the ideal RSASD.

Figure 6A:
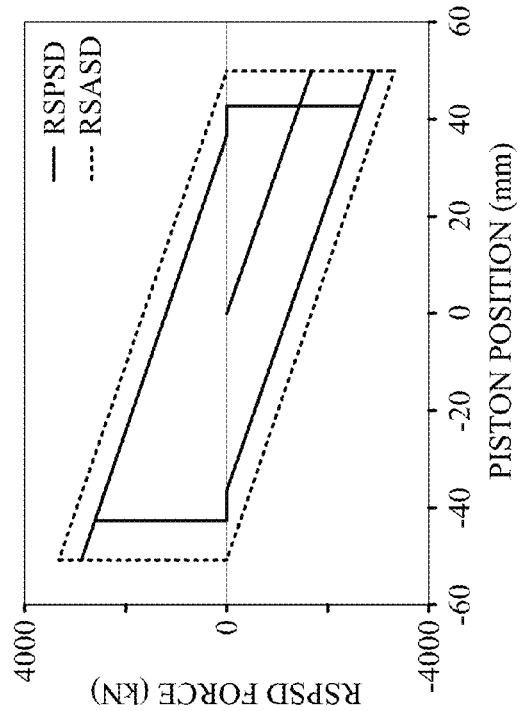
FIGS. 6a-6b are hysteresis charts illustrating the effects of a change in the sensing distance of a sensor element of an exemplary RSPSD.
Figure 6B:
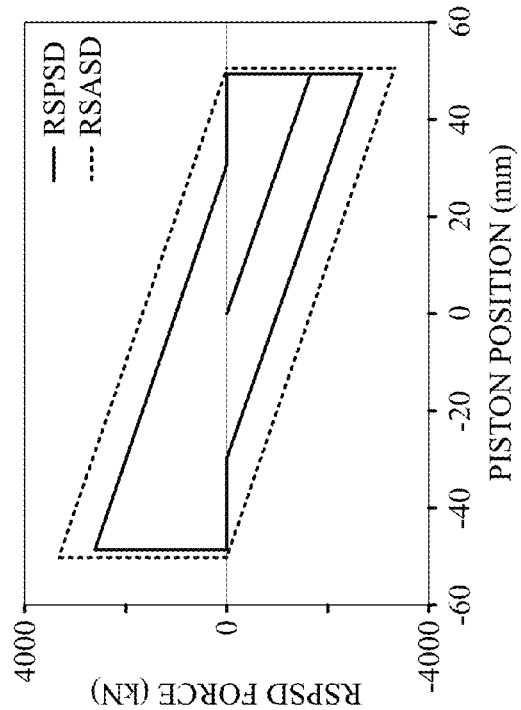
Figure 8B:
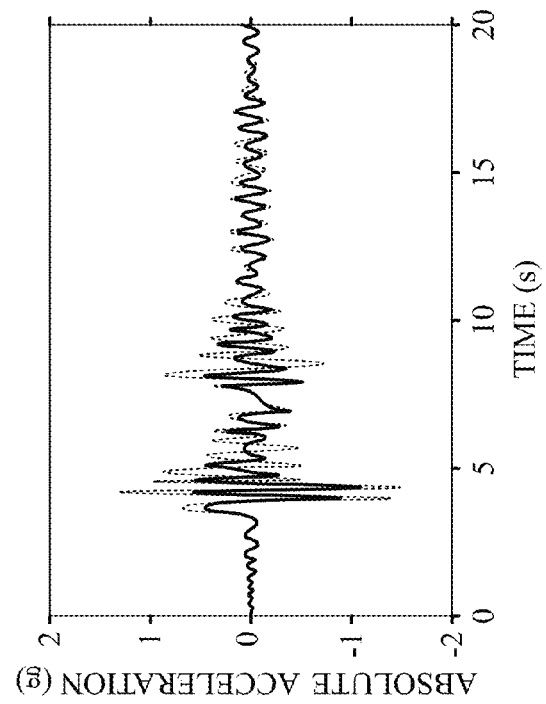
FIGS. 8a-8b graphically depict the controlled vs. uncontrolled displacement and acceleration responses of an exemplary RSPSD during a structural control simulation.
Figure 8A:
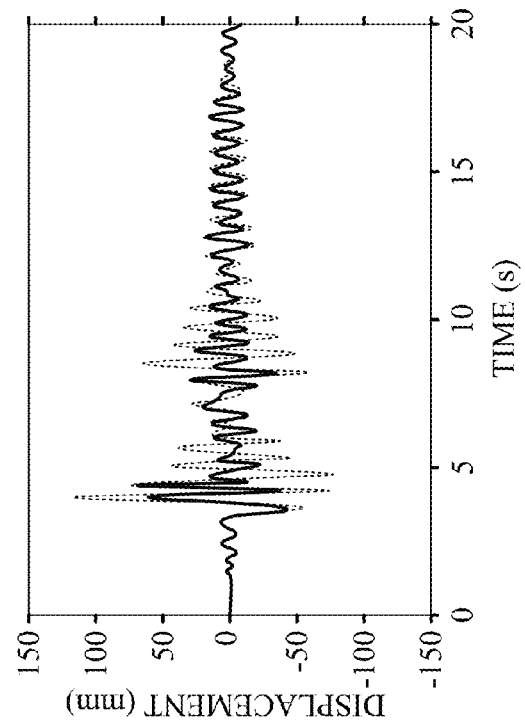
Figure 9A:
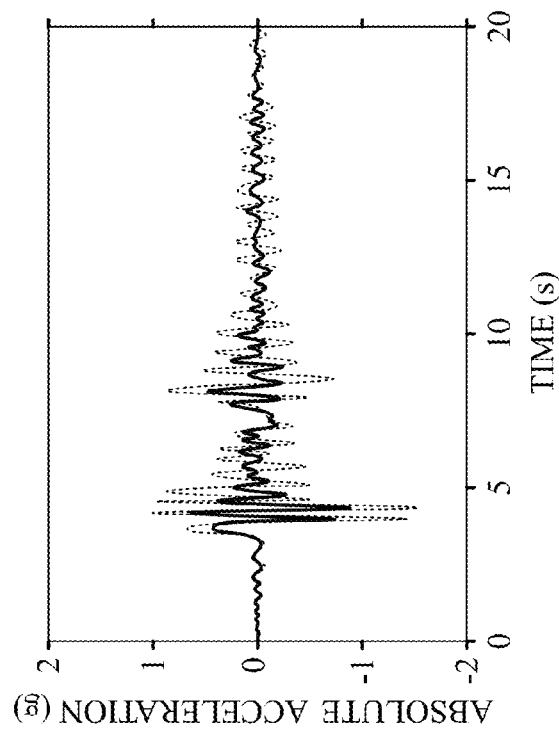
FIGS. 9a-9b graphically depict the controlled vs. uncontrolled displacement and acceleration responses of an exemplary RSASD during a structural control simulation.
Figure 9B:
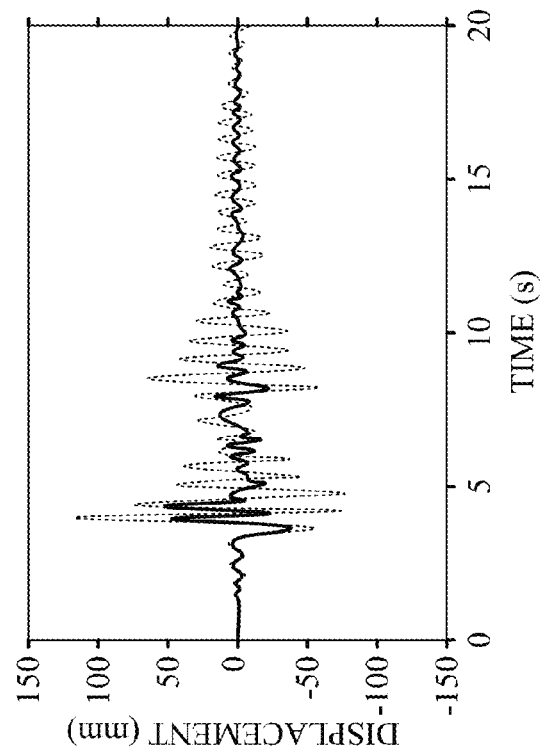

A comparison of FIG. 6a and FIG. 6b reveals the effect of the sensing distance (s) on the hysteresis of the device for a given value of (d). For a large sensing distance (s), there is a greater delay in the zeroing of the damper force once the piston has change direction. This is due to the lever traveling a longer distance prior to being sensed and opening of the valve takes place. As mentioned previously, this would correlate to stored energy being transferred back to the structure, thereby reducing the area under the hysteresis curve compared with the ideal RSASD.

However, a large sensing distance (s) also means that the valve closes quicker due to the reduced time that the lever remains in the proximity of the sensor ((s)≤y(t)<(d)). As a result, energy begins being stored sooner after the force has zeroed. For a small sensing distance (s), the force drops to zero sooner, and less energy is transferred back to the structure. On the other hand, the lever spends more time in the proximity of the sensor, thereby increasing the time the valve is open and delaying the storage of energy after the force has zeroed. As a result, the amount of energy dissipated by the device is again less than that with the ideal RSASD. In the end, the sensing distance (s) only shifts the hysteresis curve of the RSPSD, the same amount of energy is dissipated for (s)=2 mm and (s)=6 mm, and the energy is always less than that of the RSASD. This is shown in columns 3-4 of Table 1 (FIG. 7), which represents the energies dissipated (E) for both RSPSDs and the ideal RSASD for different input periods.

The results indicate that the sensing distance (s) could be arbitrarily set, as it doesn't affect the energy dissipative characteristics of the device. However, there is still a constraint on the minimum time the lever must remain in the proximity of the sensor so that the pressure has time to equalize during opening of the valve, and this time is directly related to the sensing distance (s) and the total travel distance (d). Previous research has determined this time to be in the range of 20 ms-40 ms depending on the characteristics of the valve.

In order to determine if the RSPSD meets this minimum requirement, the time ($t_s$) that the lever is in the proximity of the sensor was calculated for each RSPSD and all three input periods. The results of these calculations are presented in Columns 5 and 6 of Table 1, and show that ($t_s$) is less for smaller periods and larger sensing distances (s). Furthermore, it is observed from Column 6 that ($t_s$) for the case with T=0.6 s and (s)=6 mm is only 17 ms, and therefore does not meet the minimum requirement of 20 ms-40 ms. Based on the data presented in Table 1, careful consideration should be given to the design of a RSPSD to ensure that sufficient time is allowed for pressure equalization during resetting while simultaneously minimizing the time the valve is open.

Structural Response Mitigation

In order to evaluate the potential of a RSPSD as a structural control device, additional simulations were conducted using a single-degree-of-freedom (SDOF) building adopted from the relevant literature (i.e., Lu and Lin, 2009). The building has a period of T=0.6 s and a damping ratio of 5%. However, to investigate the performance of the RSPSD for SDOF buildings with larger periods, the stiffness of the building was reduced to yield two additional buildings with periods of T=1.8 s and T=5.4 s. The buildings were subjected to ground motion experienced during the Northridge earthquake, with a peak ground acceleration of 0.84 g. For the RSPSD, the same design parameters described in the previous section were used again, including sensing distance values of (s)=2 mm and (s)=6 mm for the sensing distance. For comparison, the uncontrolled response of the building and the response of the building with an ideal RSASD were also obtained.

FIGS. 8a-8b and 9a-9b graphically present the time history displacement and the absolute acceleration responses for the building with T=0.6 s for the RSPSD and RSASD devices. For the RSPSD, the sensing distance (s) was 2 mm. The solid line in each graph represents the controlled response. The graphs indicate that both devices are effective in reducing the displacement response of the building, but less effective in reducing the acceleration response.

Figures 10A, 10B:
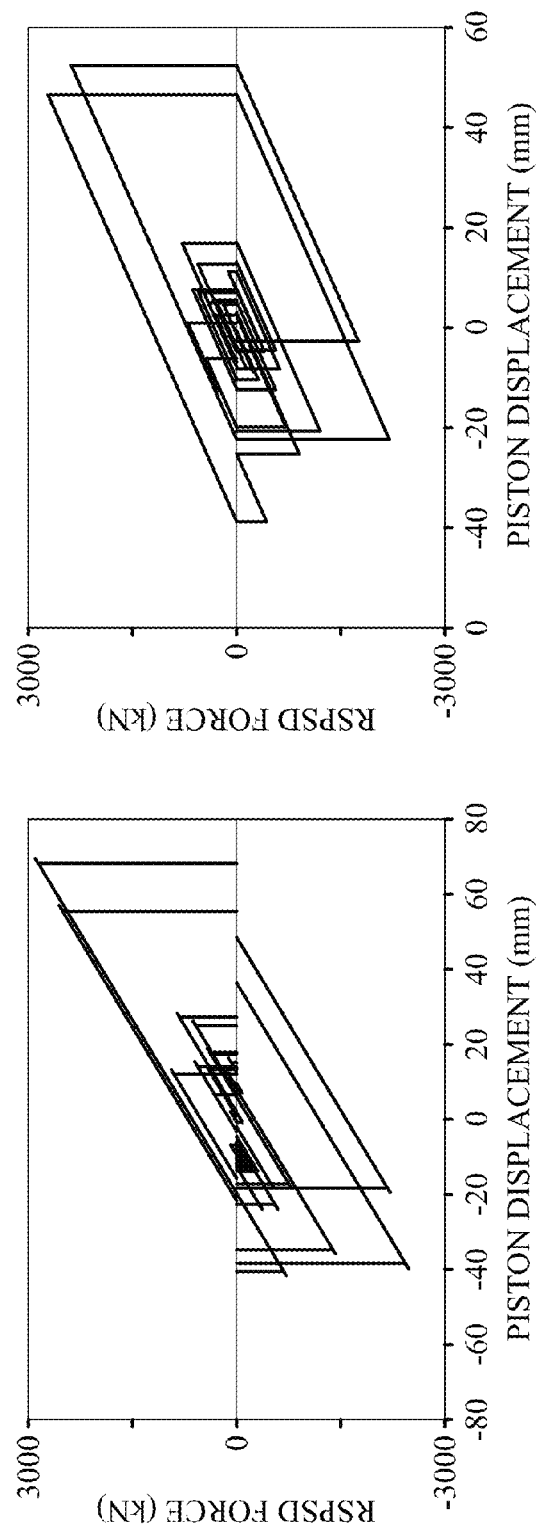
FIGS. 10a-10b graphically depict the energy dissipated by the exemplary RSPSD and RSASD corresponding to the graphs of FIGS. 8a-8b and FIGS. 9a-9b, respectively, when subjected to ground motion forces similar to those seen during the Northridge earthquake.

FIGS. 10a-10b graphically represent the energy that would be dissipated by each device during the earthquake, and demonstrate that the energy dissipation capacity of a RSPSD is comparable to that of a RSASD.

The responses for the two remaining buildings, and for the RSPSD with sensing distances of (s)=2 mm and (s)=6 mm, are presented in Table 2 (FIG. 11). Columns 2-5 of Table 2 show that the RSPSD is effective in reducing the peak displacement response of all three buildings, and its performance is comparable with that of the RSASD. Meanwhile, columns 6-9 show that the RSPSD with a sensing distance of (s)=2 mm and (s)=6 mm, along with the RSASD, increase the absolute acceleration of the building compared to the uncontrolled case. Furthermore, the performance of the RSPSD is again comparable with that of the RSASD.

It is interesting to note that the displacement response of the RSPSD with a sensing distance (s)=6 mm is slightly smaller than that obtained using (s)=2 mm for the buildings with periods of 1.8 s and 5.4 s. Meanwhile, the RSPSD using a sensing distance (s)=2 mm outperforms the RSPSD using a sensing distance (s)=6 mm with respect to reducing the acceleration response of all three buildings. These results indicate that although the energy dissipated by the RSPSD with a sensing distance (s)=2 mm and (s)=6 mm was the same for the sinusoidal displacement input, the sensing distance does have a small effect on the response of a flexible structure subject to random excitation.

Finally, the time ($t_s$) for pressure equalization was monitored for the RSPSD for both sensing distance (s) and all three buildings. It was determined that for (s)=6 mm, the value of ($t_s$) was less than the minimum required for pressure equalization for all three buildings. On the other hand, the minimum value of ($t_s$) for all three buildings using (s)=2 mm was 42 ms, which is at the high end of the required range.

Figure 12A:
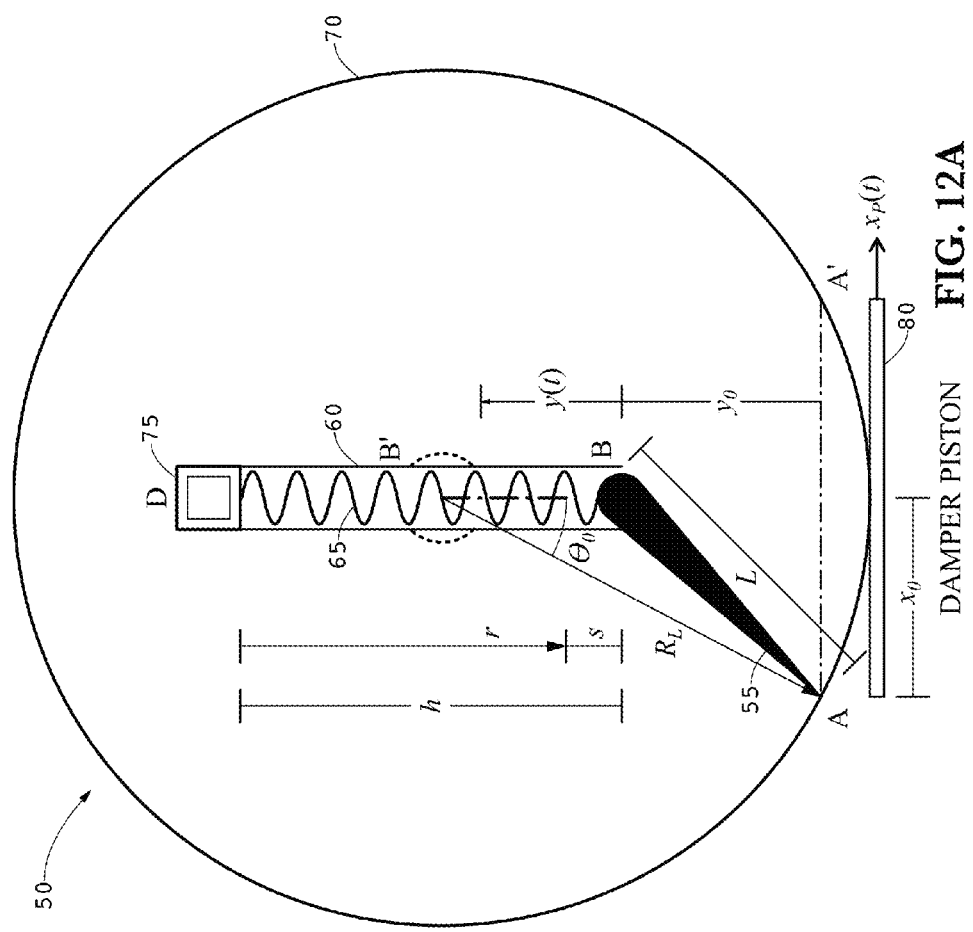
FIGS. 12a-12b schematically and respectively illustrate alternative embodiments of amplified and non-amplified triggering lever assemblies that may be used with a RSPSD of the invention.
Figure 12B:
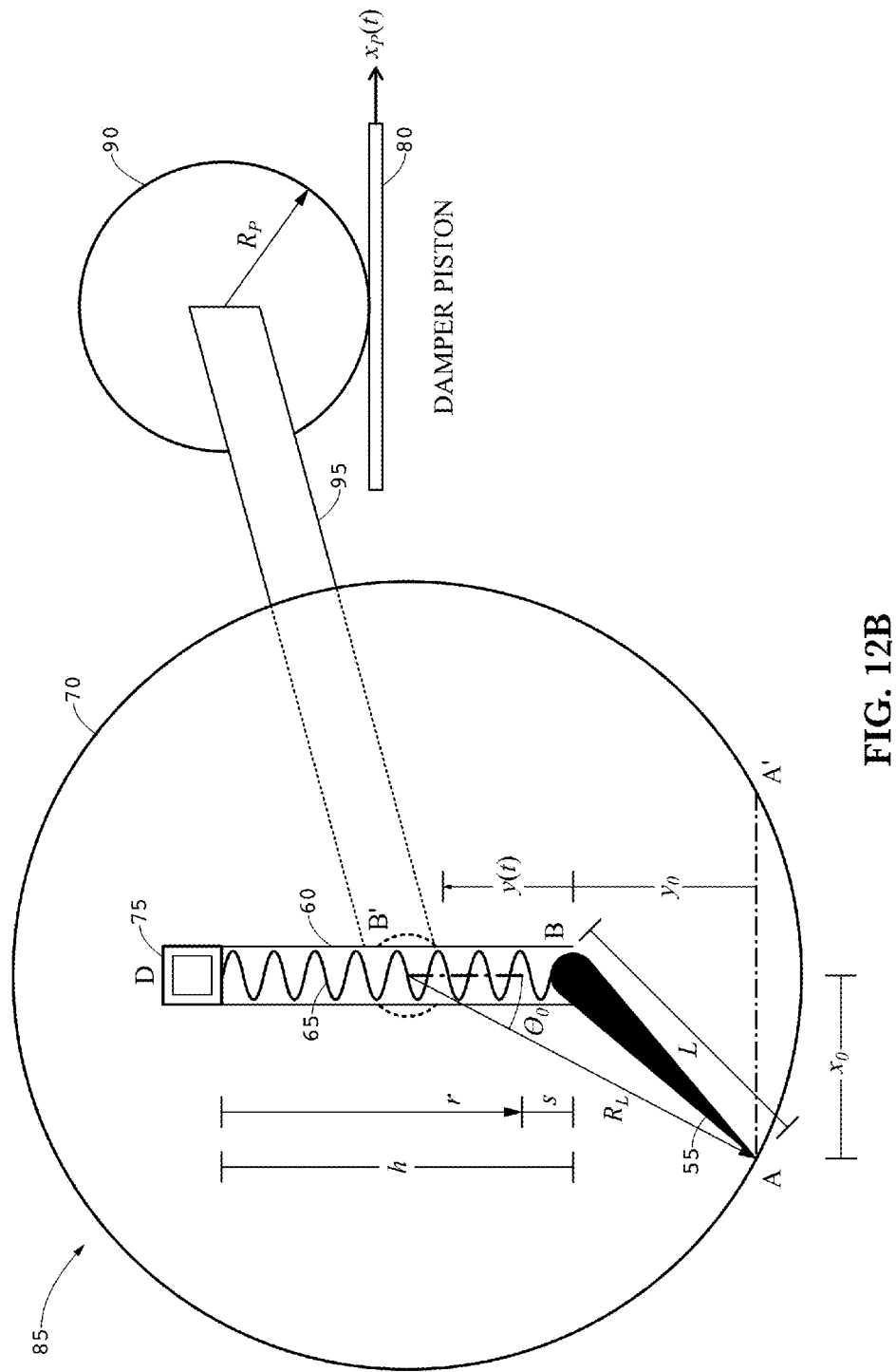

Amplified and non-amplified alternate embodiments of triggering lever assemblies 50, 85 that may be used with a RSPSD of the invention are schematically illustrated in FIGS. 12a-12b, respectively. Such lever assemblies 50, 85 may be used with the exemplary RSPSD 5 of FIG. 2, or with other alternate embodiments not specifically shown or described herein.

The triggering lever assembly 50 of FIG. 12a is shown to once again include a lever 55 with a length (L) and a second end arranged in a slotted channel 60. The lever 55 is again biased downward by a spring 65 located in the channel 60. In this embodiment, the lever 55 and channel 60 are mounted to a disc 70 in a manner that permits the disc to rotate while the channel and lever remain in the vertical position shown. A proximity sensor 75 having a range (r) is again located near the end of the channel 60 farthest from the disc 70, and at a distance (h) above the end of the lever 55 that resides in the channel.

The disc 70 has a flange (not indicated) around its circumference that provides a contact point for a first end of the lever 55, while the second end of the lever is located in the channel. Rotation of the disc 70 causes the first end of the lever 55 to move along the circumference of the disc, from point A to point A'. During this time, the second end of the lever 55 moves up and down within the channel 60 between point B to point B'. This movement of the lever 55 within the channel 60 triggers the proximity sensor 75 located at D.

For the configuration shown in FIG. 12a, the disc 70 rides on or is mounted on the damper piston 80 of the RSPSD or an element that moves therewith. Consequently, movement of the damper piston 80 or associated element will cause the above-described rotation of the disc 70 and resulting movement of the lever 55.

Figure 2:
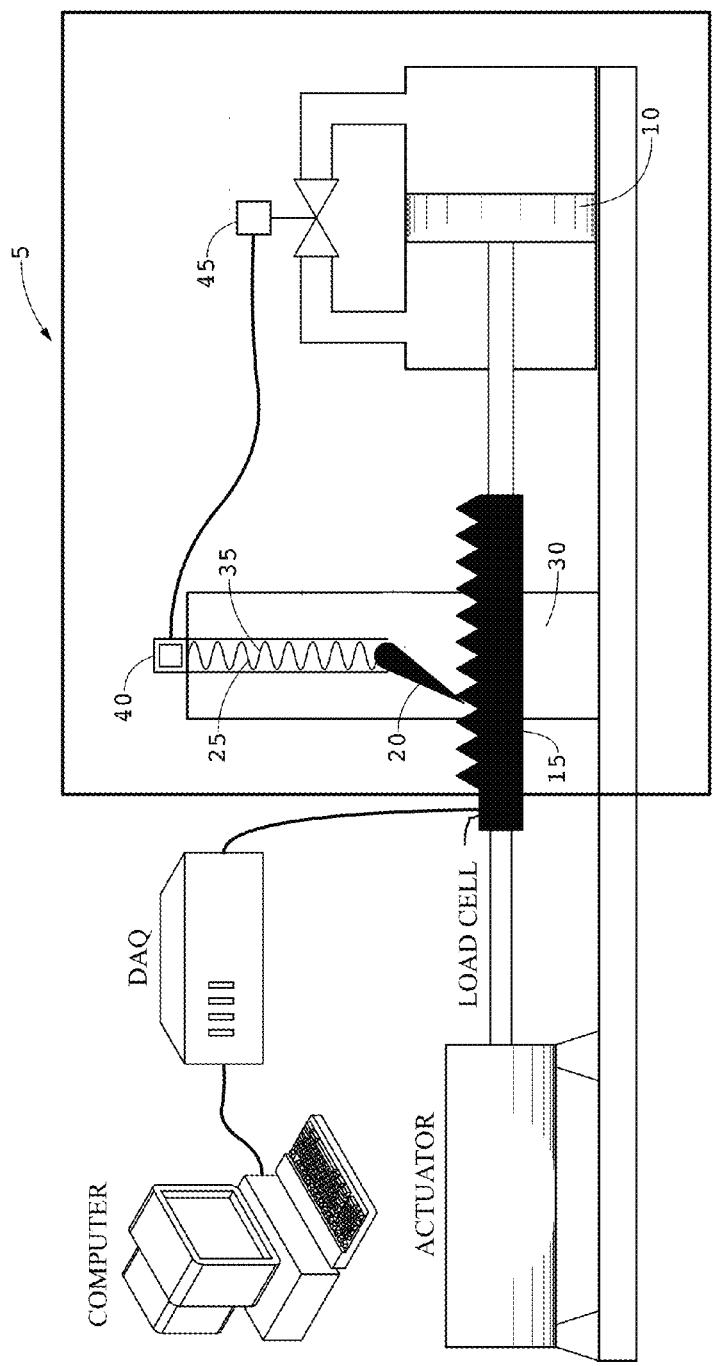
FIG. 2 schematically represents an exemplary embodiment of a RSPSD according to the invention.

A primary benefit of the configuration shown in FIG. 12a versus that shown in FIG. 2 is that the entire assembly may be mounted on the damper piston by attaching it directly to the damper cylinder, without the need for the rack 15 and the vertical column 30 of FIG. 2. The main difference between the lever configuration of FIG. 12a and the lever configuration shown in FIG. 2 is that in the configuration of FIG. 12a there is less vertical displacement of the lever in the channel for the same horizontal displacement of the piston damper. Equation (2) below relates the vertical displacement of the lever in the channel to the horizontal displacement of the damper piston for the configuration shown in FIG. 12a.

$$y(t) = \left[\sqrt{L^2 - [x_o - x(t)]^2} - (L - d)\right] - \left[\sqrt{R_L^2 - [x_o - x(t)]^2} - \sqrt{R_L^2 - x_o^2}\right] \quad (2)$$

$$x(t) = x_o - R_L \sin(\varphi_o - \varphi(t))$$

$$\varphi(t) = \frac{x_p(t)}{R_L}$$

-continued $$y(t) = \left[\sqrt{L^2 - \left[R_L\sin\left(\varphi_o - \frac{x_p(t)}{R_L}\right)\right]^2} - (L-d)\right] - \left[\sqrt{R_L^2 - \left[R_L\sin\left(\varphi_o - \frac{x_p(t)}{R_L}\right)\right]^2} - \sqrt{R_L^2 - x_o^2}\right]$$

where L is the length of the lever, $R_L$ is the radius of the disc, $\varphi_0$ is the angle formed between the lever and a radial line extending from the first end of the lever, $x_p(t)$ is the distance of movement of the piston, d is the total vertical travel distance of the lever within the slotted channel, and $x_0$ is the distance between the slotted channel and the contact point of the lever with the circumferential flange of the disc.

FIG. 12b depicts a variation of the triggering lever assembly 50 of FIG. 12a. The triggering lever assembly 85 of FIG. 12b employs all of the various elements of the triggering lever assembly 50 of FIG. 12a, including the lever 55 with its second end arranged in a slotted channel 60, the lever 55 being biased downward by the spring 65 located in the channel, and the proximity sensor 75 located near the end of the channel 60 farthest from the disc 70. The lever 55 and channel 60 are again mounted to the disc 70 in a manner that permits the disc to rotate while the channel and lever remain in the vertical position shown.

In the triggering lever assembly 85 of FIG. 12b, however, the disc 70 to which the lever and channel are mounted is the larger of two discs present in the assembly. More particularly, in this embodiment, the larger disc 70 is fixed to one end of a rigid shaft 95, while a smaller disc 90 is fixed to the other end of the rigid shaft 95, such that the larger disc 70, the smaller disc 90, and the shaft 95 rotate with the same angular displacement, and the smaller disc 90 rides on or is mounted on the damper piston 80 of the RSPSD or an element that moves therewith. Furthermore, the disc-shaft assembly is mounted in a manner that permits the larger disc 70, the smaller disc 90, and the shaft 95 to rotate while the channel and lever remain substantially in the vertical position shown. Consequently, linear movement of the damper piston 80 or associated element will rotate the smaller disc 90 which will, in turn, cause a rotation of the larger disc 70 and a resulting movement of the lever 55 as described above with respect to the configuration of FIG. 12a.

In the configuration of FIG. 12b, the horizontal displacement/velocity of the damper piston 80 associated with the smaller disc 90 is related to the circumferential displacement/velocity of point A on the larger disc 70 through the ratio of the radii of the two discs. By making the radius of the larger disc 70 greater than the radius of the smaller disc 90, the circumferential displacement/velocity of point A on the larger disc 70 is magnified relative to the horizontal displacement/velocity of the damper piston 80 according to the ratio of the radii of the larger disc 70 to the smaller disc 90.

A benefit of this configuration is more flexibility in the RSPSD design. For example, the radial ratio of the larger disc 70 to the smaller disc 90 may be adjusted so that point A on the larger disc 70 moves through a circumferential velocity that is twice that of the horizontal velocity of the damper piston 80. As a result, the lever 55 will move from point A to point A' faster, the lever will spend less time in the sensing range of the sensor 75, and the resetting time will be reduced relative to the configuration shown in FIG. 12a for the same horizontal displacement of the damper piston 80.

The configuration in FIG. 12b may also be used to achieve the same resetting time as the configuration of FIG. 12a, but for a longer lever. Equation (3) below relates the vertical displacement of the lever in the channel to the horizontal displacement of the damper piston for the configuration shown in FIG. 12b.

$$y(t) = \left[\sqrt{L^2 - [x_o - x(t)]^2} - (L-d)\right] - \left[\sqrt{R_L^2 - [x_o - x(t)]^2} - \sqrt{R_L^2 - x_o^2}\right] \quad (3)$$

$$x(t) = x_o - R_L\sin(\varphi_o - \varphi(t))$$

$$\varphi(t) = \frac{x_p(t)}{R_P}$$

$$y(t) = \left[\sqrt{L^2 - \left[R_L\sin\left(\varphi_o - \frac{x_p(t)}{R_P}\right)\right]^2} - (L-d)\right] - \left[\sqrt{R_L^2 - \left[R_L\sin\left(\varphi_o - \frac{x_p(t)}{R_P}\right)\right]^2} - \sqrt{R_L^2 - x_o^2}\right]$$

where L is the length of the lever, $R_L$ is the radius of the larger disc, $\varphi_0$ is the angle formed between the lever and a radial line of the first disc that extends to the first end of the lever, $x_p(t)$ is the distance of movement of the piston, $R_p$ is the radius of the smaller disc, d is the total vertical travel distance of the lever within the slotted channel, and $x_0$ is the distance between the slotted channel and the contact point of the lever with the circumferential flange of the first disc.

Further alternate embodiments of amplified and non-amplified triggering lever assemblies 100, 140 that may be used with a RSPSD of the invention are schematically illustrated in FIGS. 13a-13b, respectively. Such lever assemblies 100, 140 may be used with the exemplary RSPSD 5 of FIG. 2, or with other alternate embodiments not specifically shown or described herein.

The lever assembly 100 of FIG. 13a is shown to again include a lever 105 with a length (L) and a second end arranged in a slotted channel 110. The lever 105 is again biased downward by a spring 115 located in the channel 110. In this embodiment, the lever 105 and channel 110 are associated with a column 120 or similar element that is in turn mounted to a disc 125 by an axle or in some other manner that permits the disc to rotate while the channel and lever remain in the vertical position shown. A proximity sensor 130 having a range (r) is again located near the end of the channel 110 farthest from the disc 125, and at a distance (h) above the end of the lever 105 that resides in the channel.

In this embodiment, the channel 110 is located on such that the contact point between the lever and the disc 125 occurs along the periphery (circumference) of the disc or a flange attached thereto, while the second end of the lever remains in the channel 110. Rotation of the disc 125 causes the first end of the lever 105 to move along the circumference of the disc 125, from point A to point A'. During this time, the second end of the lever 105 moves up and down within the channel 110 between point B to point B'. This movement of the lever 105 within the channel 110 triggers the proximity sensor 130 located at D.

For the configuration shown in FIG. 13a, the disc 125 rides on or is mounted on the damper piston 135 or an element that moves therewith. Consequently, movement of the damper piston 135 or associated element will cause the above-described rotation of the disc 125 and resulting movement of the lever 105.

A primary benefit of the configuration shown in FIG. 13a versus the configuration shown in FIG. 2 is that the entire assembly may be mounted on the damper piston by attaching it directly to the damper cylinder, without the need for the rack 15 and the vertical column 30 of FIG. 2. The main difference between the lever configuration of FIG. 13a and the lever configuration shown in FIG. 2 is that in the configuration of FIG. 13a there is more vertical displacement of the lever in the channel for the same horizontal displacement of the piston damper. Equation (4) relates the vertical displacement of the lever in the channel to the horizontal displacement of the damper piston.

$$y(t) = \left[\sqrt{L^2 - [x_o - x(t)]^2} - (L-d)\right] + \left[\sqrt{R_L^2 - [x_o - x(t)]^2} - \sqrt{R_L^2 - x_o^2}\right] \quad (4)$$

$$x(t) = x_o - R_L \sin(\varphi_o - \varphi(t))$$

$$\varphi(t) = \frac{x_p(t)}{R_L}$$

$$y(t) = \left[\sqrt{L^2 - \left[R_L \sin\left(\varphi_o - \frac{x_p(t)}{R_L}\right)\right]^2} - (L-d)\right] + \left[\sqrt{R_L^2 - \left[R_L \sin\left(\varphi_o - \frac{x_p(t)}{R_L}\right)\right]^2} - \sqrt{R_L^2 - x_o^2}\right]$$

where L is the length of the lever, $R_L$ is the radius of the disc, $\varphi_0$ is the angle formed between vertical and a radial line extending to the first end of the lever, $x_p(t)$ is the distance of movement of the piston, d is the total vertical travel distance of the lever within the slotted channel, and $x_0$ is the distance between the slotted channel and the contact point of the lever with the peripheral surface of the disc.

FIG. 13b depicts a variation of the triggering lever assembly 100 of FIG. 13a. The triggering lever assembly 140 of FIG. 12b employs all of the various elements of the triggering lever assembly 100 of FIG. 13a, including the lever 105 with its second end arranged in a slotted channel 110, the lever 105 being biased downward by the spring 115 located in the channel 110, and the proximity sensor 130 located near the end of the channel 110 farthest from the disc 125. The lever 105 and channel 110 are again mounted to the disc by a column 120 or similar element that is in turn mounted to the disc 125 by an axle or in some other manner that permits the disc to rotate while the channel and lever remain in the vertical position shown.

In the triggering lever assembly 140 of FIG. 13b, however, the disc 125 to which the lever and channel are mounted is the larger of two discs present in the assembly. More particularly, in this embodiment, the larger disc 125 is fixed to one end of a rigid shaft 150, while a smaller disc 145 is fixed to the other end of the rigid shaft 150, such that the larger disc 125, the smaller disc 145, and the rigid shaft 150 rotate with the same angular displacement, and the smaller disc 145 rides on or is mounted on the damper piston 135 of the RSPSD or an element that moves therewith. Furthermore, the disc-shaft assembly is mounted in a manner that permits the larger disc 125, the smaller disc 145, and the shaft 150 to rotate while the channel and lever remain in the vertical position shown. Consequently, linear movement of the damper piston 135 or associated element will rotate the smaller disc 145 which will, in turn, cause a rotation of the larger disc 125 and a resulting movement of the lever 105 as described above with respect to the configuration of FIG. 13a.

In the configuration of FIG. 13b, the horizontal displacement/velocity of the damper piston 135 associated with the smaller disc 145 is related to the circumferential displacement/velocity of point A on the larger disc 125 through the ratio of the radii of the two discs. By making the radius of the larger disc 125 greater than the radius of the smaller disc 145, the circumferential displacement/velocity of point A on the larger disc 125 is magnified relative to the horizontal displacement/velocity of the damper piston 135 according to the ratio of the radii of the larger disc 125 to the smaller disc 145.

A benefit of this configuration is more flexibility in the RSPSD design. For example, the radial ratio of the larger disc 125 to the smaller disc 145 may be adjusted so that point A on the larger disc 145 moves through a circumferential velocity that is twice that of the horizontal velocity of the damper piston 135. As a result, the lever 105 will move from point A to point A' faster, the lever will spend less time in the sensing range of the sensor 130, and the resetting time will be reduced relative to the configuration shown in FIG. 13a for the same horizontal displacement of the damper piston 80.

The configuration in FIG. 13b may also be used to achieve the same resetting time as the configuration of FIG. 13a, but for a longer lever. Equation (5) below relates the vertical displacement of the lever in the channel to the horizontal displacement of the damper piston for the configuration shown in FIG. 13b.

$$y(t) = \left[\sqrt{L^2 - [x_o - x(t)]^2} - (L-d)\right] + \left[\sqrt{R_L^2 - [x_o - x(t)]^2} - \sqrt{R_L^2 - x_o^2}\right] \quad (5)$$

$$x(t) = x_o - R_L \sin(\varphi_o - \varphi(t))$$

$$\varphi(t) = \frac{x_p(t)}{R_P}$$

$$y(t) = \left[\sqrt{L^2 - \left[R_L \sin\left(\varphi_o - \frac{x_p(t)}{R_P}\right)\right]^2} - (L-d)\right] + \left[\sqrt{R_L^2 - \left[R_L \sin\left(\varphi_o - \frac{x_p(t)}{R_P}\right)\right]^2} - \sqrt{R_L^2 - x_o^2}\right]$$

where L is the length of the lever, $R_L$ is the radius of the larger disc, $\varphi_0$ is the angle formed between vertical and a radial line of the first disc that extends to the first end of the lever, $x_p(t)$ is the distance of movement of the piston, $R_p$ is the radius of the smaller disc, d is the total vertical travel distance of the lever within the slotted channel, and $x_0$ is the distance between the slotted channel and the contact point of the lever with the peripheral surface of the first disc.

Figure 14:
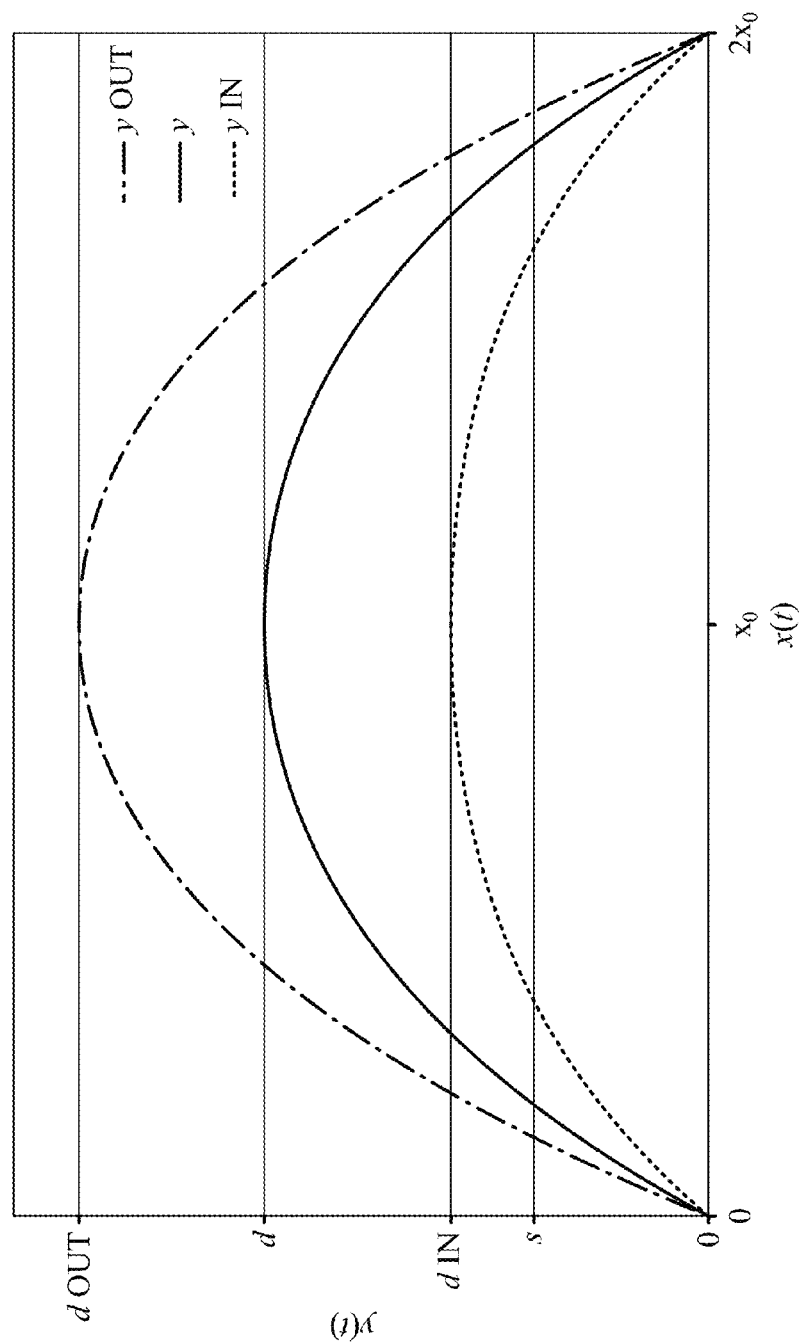

A comparison of the vertical displacement of the lever in the channel versus the horizontal displacement of the damper piston for the configurations shown in FIG. 2, FIG. 12a, and FIG. 13a is graphically illustrated in FIG. 14. With respect to differentiating the three curves, y represents the vertical displacement of the lever in FIG. 2, $y_{in}$ represents the vertical displacement of the lever in FIG. 12a, and $y_{out}$ represents the vertical displacement of the lever in FIG. 13a.

FIG. 14 demonstrates that the effect of mounting the lever-channel on a disc is to increase or decrease the vertical displacement of the lever in the channel relative to a configuration with no disc. For a proximity sensor with sensing distance (s), this either increases or decreases the time that the lever is in the sensing range of the sensor, resulting in an increase or decrease in the resetting time (relative to a configuration with no disc).

An objective of the different RSPSD configurations is to provide for more control over the relationship between the vertical displacement of the lever in the channel and the horizontal displacement of the damper piston, leading to more flexibility in the RSPSD design. With this objective in mind, each of the configurations in FIG. 2, FIG. 12a, and FIG. 13a can be further modified by incorporating a scissor-jack mechanism 200 such as that shown in FIG. 15.

This exemplary scissor-jack mechanism 200 consists of four members of equal length l pinned together at their ends (joints) and initially oriented at an angle $\alpha_o$ with respect to the scissor-jack centerline. One end of the scissor-jack is attached to a stationary point D, while the other is attached to the end of the lever B located in the vertical channel. Vertical displacement of the end of the lever in the channel from point B to point B' causes horizontal displacement of joint C on the scissor-jack from point C to point C', thereby triggering the proximity sensor located at E.

By incorporating a properly designed scissor-jack, the horizontal displacement of joint C can either be increased or decreased relative to the vertical displacement of the lever in the channel, thereby providing more flexibility in the design of the RSPSD. For the case where the horizontal displacement of joint C is increased relative to the vertical displacement of the lever, the result will be a decrease in the amount of time that the proximity sensor is engaged relative to the case with no scissor-jack, for the same sensing distance s. As a result, the scissor-jack can be used to reduce the resetting time of the RSPSD. For the case when the horizontal displacement of joint C is decreased relative to the vertical displacement of the lever, the opposite is true. Equation (6) below relates the horizontal displacement of joint C on the scissor-jack to the vertical displacement of the lever in the channel.

$$u(t) = 2l\left[\sin\left(\cos^{-1}\left(\frac{2l\cos\alpha_o - y(t)}{2l}\right)\right) - \sin\alpha_o\right] \quad (6)$$

Figure 15:
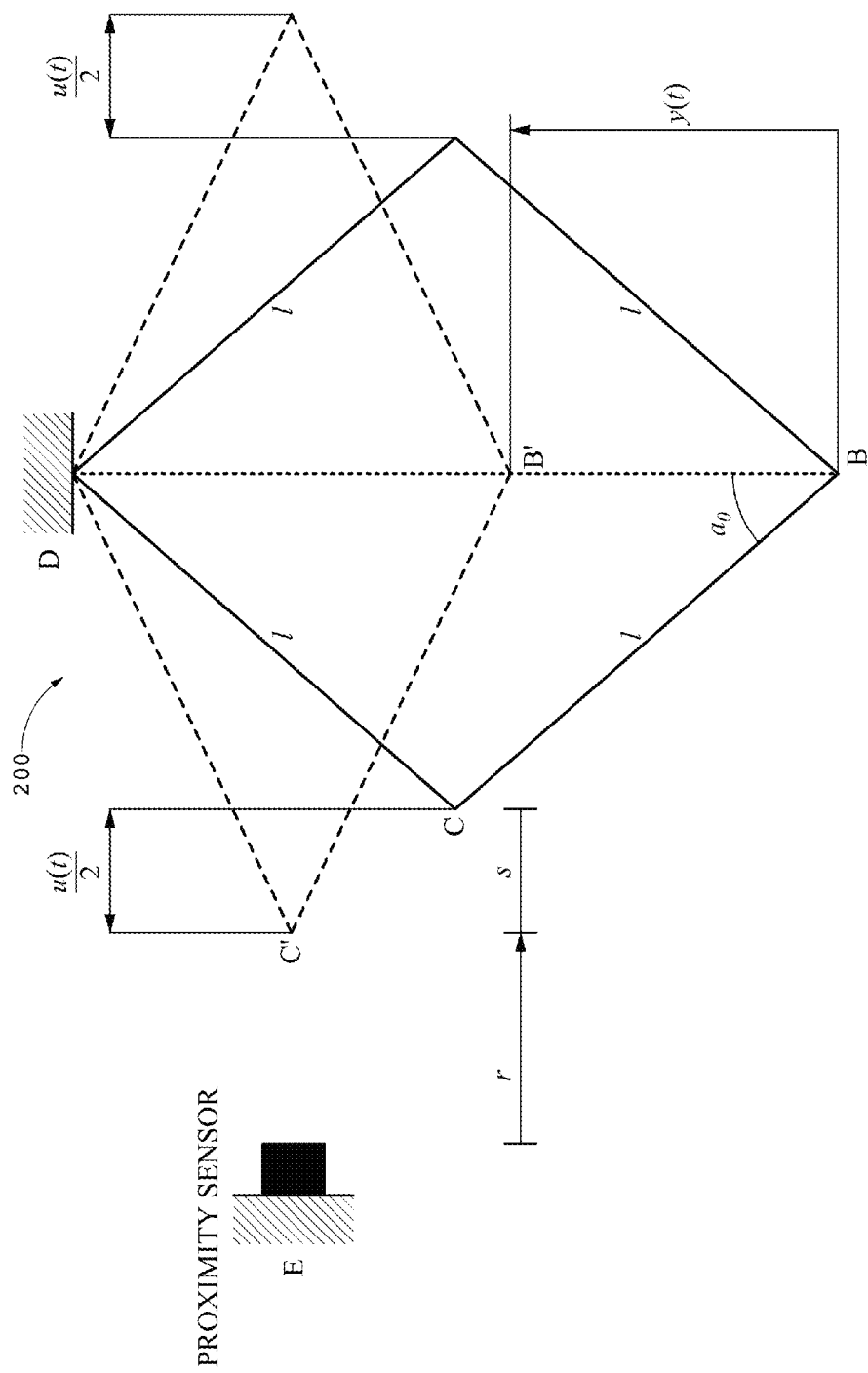
FIG. 15 depicts an exemplary scissor-jack mechanism that can be connected to a lever of a RSPSD to provide more flexibility in the design thereof.
Figure 16:
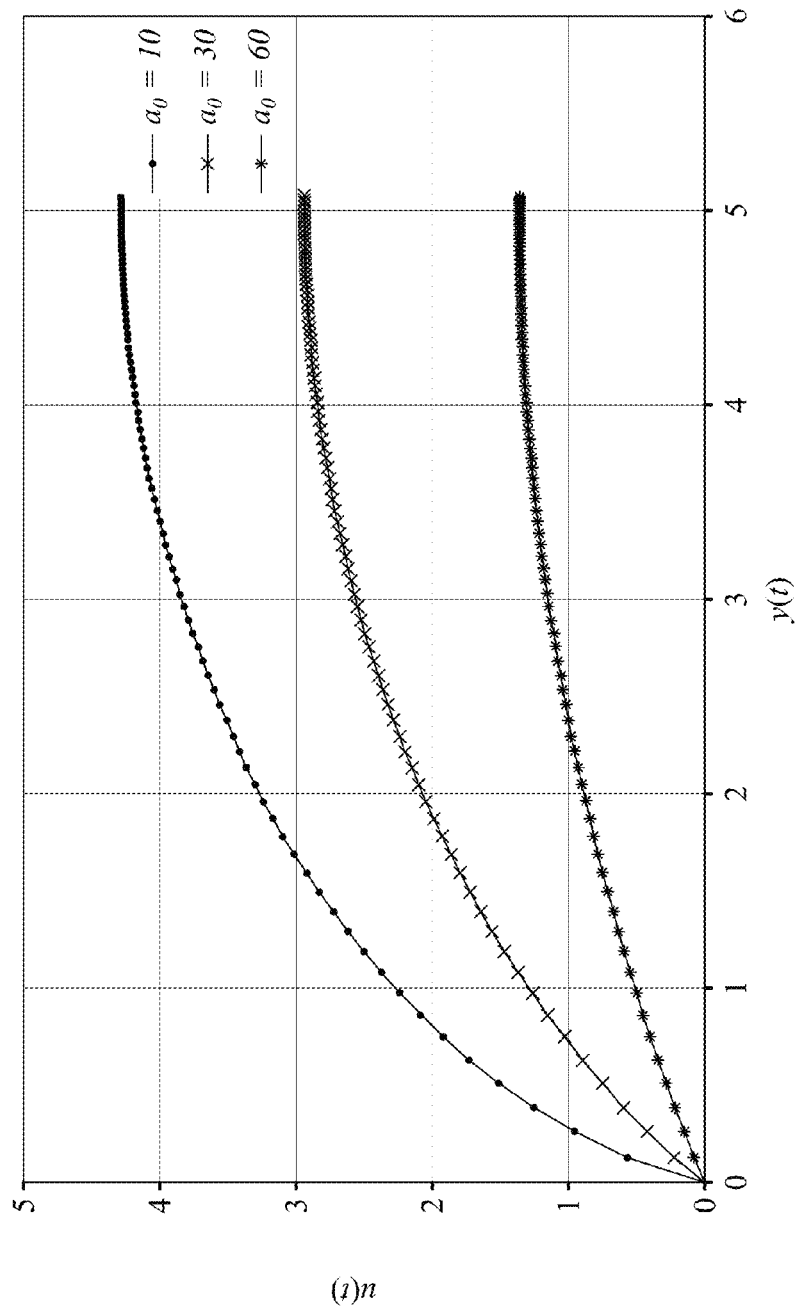
FIG. 16 is a plot of the relative horizontal displacement of between two joints of the scissor-jack mechanism of FIG. 15 during use.

FIG. 16 is a plot of the horizontal displacement of joint C versus the total vertical lever displacement from point B to point D, as shown in FIG. 15. FIG. 16 demonstrates that for values of the angle $\alpha_o$ equal to 10 and 30 degrees, the horizontal displacement of joint C is initially increased relative to the vertical displacement of the lever. However, as the vertical displacement of the lever increases, the amount of relative increase in the horizontal displacement of the lever decreases. Meanwhile, for values of the angle $\alpha_o$ equal to 60 degrees, the horizontal displacement of joint C is always less than the vertical displacement of the lever.

Figure 17:
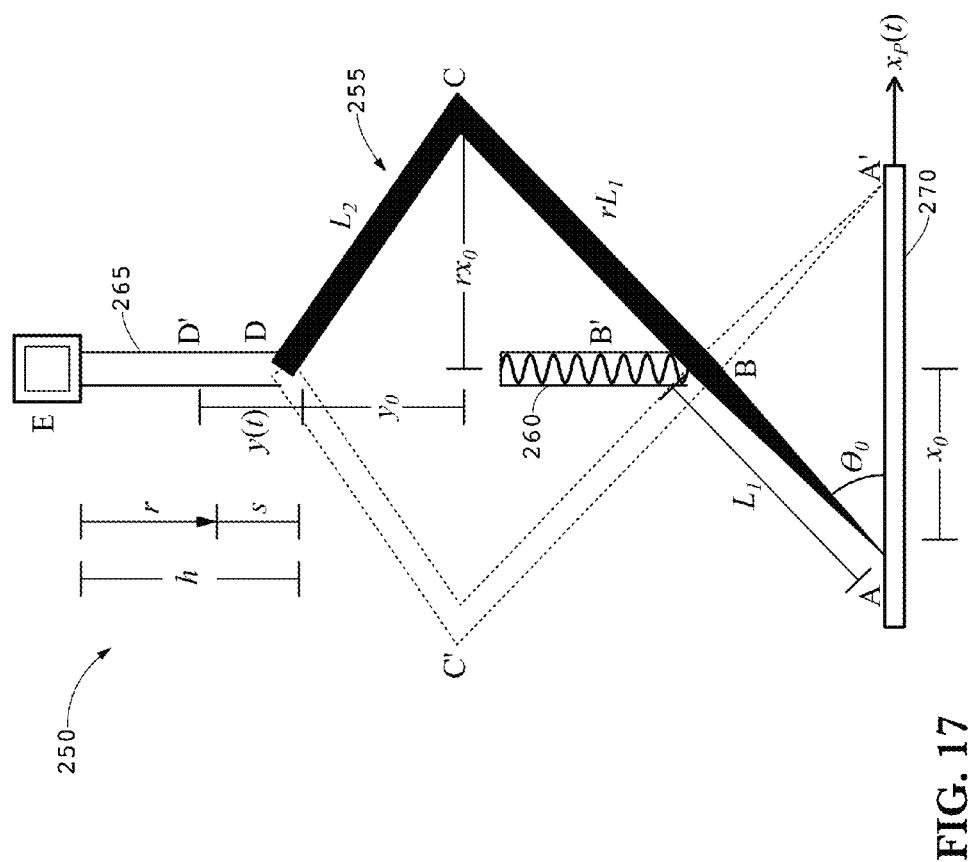
FIG. 17 schematically illustrates yet another exemplary embodiment of a triggering lever assembly that may be used with a RSPSD of the invention, wherein a single mechanism acts as both the lever and the amplifying component.

Yet another exemplary embodiment of the invention is shown in FIG. 17. In this exemplary embodiment of a RSPSD 250, a single mechanism acts as the lever and amplifying component of the system. In this configuration, the lever 255 is extended so that while one end is in contact with a rack 270 at point A, the other end is pivotally connected to a rod CD at point C such that the lever ABC is free to rotate about rod CD at point C. The extended lever is rotatably connected to a lower channel 260 at point B such that the lever is allowed to move vertically within the lower channel and to rotate about point B thereof that resides in the lower channel. The rod CD is connected to an upper channel 265 at point D such that the rod is allowed to move vertically within the upper channel and to rotate about the end D thereof that resides in the upper channel.

Horizontal displacement of the rack 270 drives the end of the lever in contact with the rack from point A to point A'. During this time, lever ABC moves up the lower channel from point B to point B', while simultaneously rotating about point B which resides in the channel. The vertical displacement and rotation of lever ABC is accompanied by vertical displacement and rotation of rod CD, thereby causing the end of rod CD at point D in the upper channel to move from point D to point D', and triggering the proximity sensor located at point E.

In this configuration, the horizontal displacement/velocity of the end of the lever in contact with the rack at A from point A to point A' is related to the horizontal displacement/velocity of point C from point C to point C' by the ratio of the lever ABC arm lengths r(r=$\overline{BC}$|$\overline{AB}$). By making the length of arm BC longer than that of arm AB, the horizontal displacement/velocity of point C is magnified relative to the horizontal displacement/velocity of point A according to r. The advantage of this configuration is more flexibility in the RSPSD design. For example, the ratio of the lever arm lengths r may be adjusted so that the horizontal velocity of point C is twice that of the horizontal velocity of point A. If the horizontal displacement of point C is made equal to the rack displacement shown in FIG. 2, the rod will move from point C to point C' faster, the lever will spend less time within the sensing range of the sensor, and the resetting time will be reduced (relative to the configuration in shown in FIG. 2).

The configuration of FIG. 17 may also be used to achieve the same resetting time as the configuration of FIG. 2, but for a longer lever. In this regard, equation (7) relates the vertical displacement of rod CD in the upper channel 265 to the horizontal displacement of the rack 270.

$$y(t)=(1+r)[\sqrt{L_1^2-[x_o-x_p(t)]^2}-\sqrt{L_1^2-x_o^2}]+[\sqrt{L_2^2-r^2[x_o-x_p(t)]^2}-\sqrt{L_2^2-r^2x_o^2}] \quad (7)$$

Figure 18:
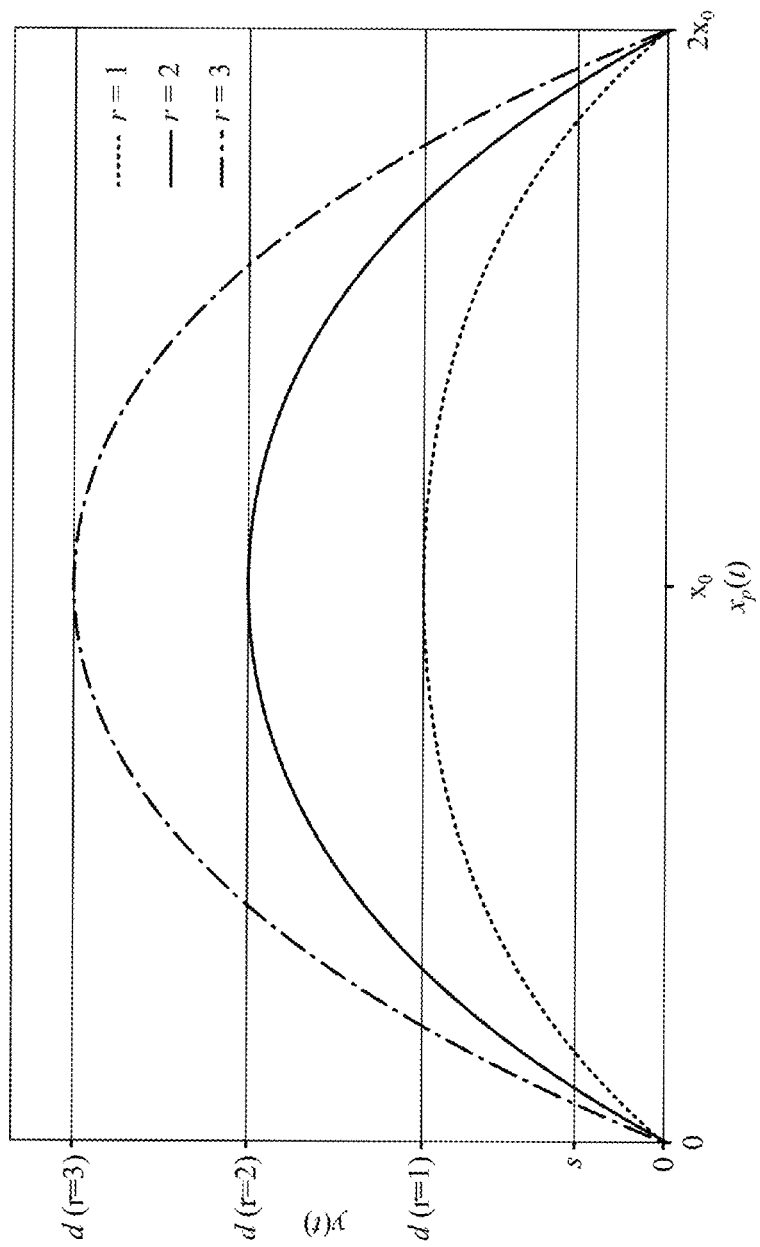
FIG. 18 graphically illustrates the vertical displacement of a rod portion in an upper channel portion of the lever assembly of FIG. 17 versus the horizontal displacement of a rack element for different values of the ratio r, and FIG. 19 schematically illustrates another alternative embodiment of a triggering lever assembly that may be used with a RSPSD of the invention.

FIG. 18 graphically illustrates the vertical displacement of the rod CD in the upper channel 265 versus the horizontal displacement of the rack 270 for different values of the ratio r, and demonstrates the amplifying effect of the lever ABC in the configuration shown in FIG. 17. It should be noted that the alternate configuration shown in FIG. 17 could also be mounted in the disc configurations shown in FIGS. 12a-12b and 13a-13b.

Figure 19:
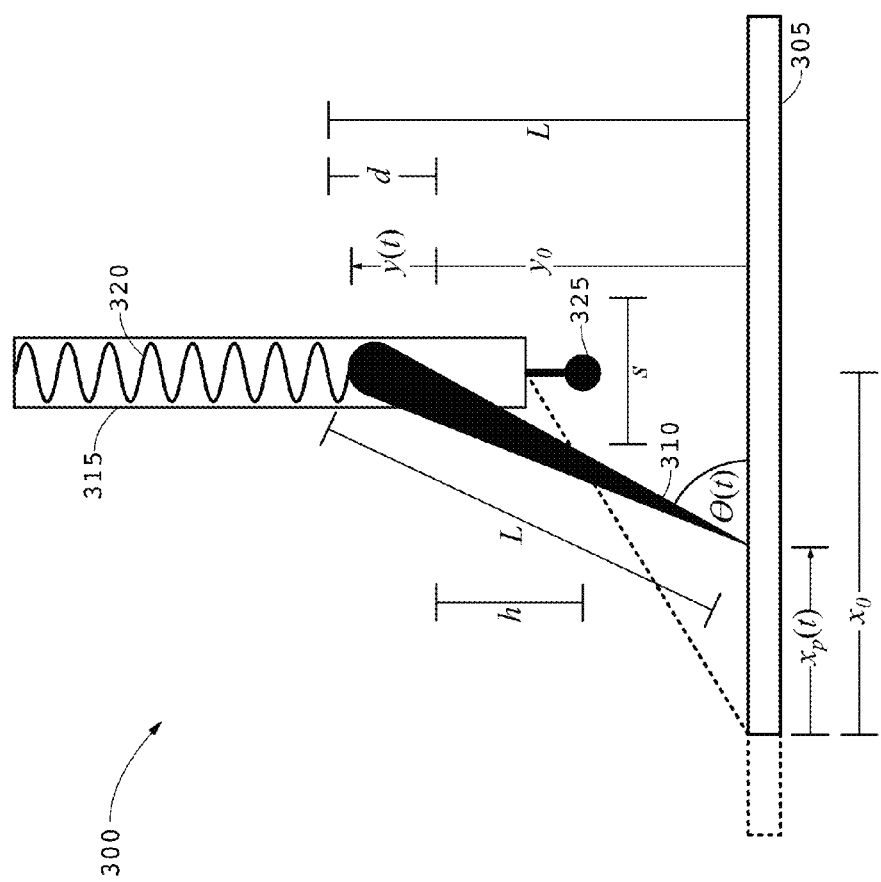

Another alternate embodiment of a triggering lever assembly 300 that may be used with a RSPSD of the invention is schematically illustrated in FIG. 19. Such a lever assembly 300 may be used with the exemplary RSPSD 5 of FIG. 2, or with other alternate embodiments not specifically shown or described herein. Furthermore, it should be understood that the triggering lever assemblies of FIGS. 3a-3b, 12a-12b, 13a-13b and 17 may be modified to move the proximity sensor to a position like that shown in FIG. 19.

The triggering lever assembly 300 of FIG. 19 is shown to once again include a lever 310 with a length (L) and a first end arranged in a slotted channel 315 at a distance ($y_e$) above a rack 305. The lever 310 is again biased downward by a spring 320 located in the channel 315.

As with previous embodiments, the lever 310 is allowed to move vertically within the channel 315 and to rotate about the end thereof that resides in the channel. The opposite end of the lever 310 rests on grooves in the rack 305, at a transverse distance ($x_0$) from the slotted channel 315 and at an orientation of ($\theta$) with respect to the rack. As the angle $\theta$ between the lever 310 and the rack 305 is time dependent, the angle is represented in FIG. 19 as θ(t).

In a manner similar to that of the embodiment shown in FIGS. 3a-3b, when the rack 305 of the assembly 300 of FIG. 19 is moving to the left, the vertical position of the lever 310 remains unaffected. However, when the direction of movement of the rack 305 reverses and moves to the right (as indicated in FIG. 19), the rack-contacting end of the lever 310 becomes engaged with the grooves of the rack 305 and, upon engagement, further movement of the rack in this direction forces the lever to rotate while simultaneously driving the lever into the slotted channel 315 by some associated distance (y(t)). Horizontal movement of the rack 305 also causes a like movement of the rack-contacting end of the lever 310, the distance of movement at any given time being indicated by ($x_r$(t)).

Like the previously described triggering lever assemblies, this triggering lever assembly 300 also employs a proximity sensor 325 that communicates with a bypass valve 45 on the cylinder 10. However, unlike the previously described exemplary triggering lever assemblies, this variation of the triggering lever assembly 300 employs a proximity sensor 325 that is located outside of the channel 315. More particularly, the proximity sensor 325 is located at a distance (h) below the end of the channel 315 that is closest to the rack 305, and is oriented such that the sensing direction is substantially perpendicular to the plane in which the rack-lever mechanism motion occurs (i.e., the sensing direction extends perpendicularly from the page in FIG. 19).

In the configuration of FIG. 19, a sensing material (not specifically shown) that triggers the proximity sensor 325 may be mounted to the body of the lever 310 rather than the end that resides in the channel 315. Alternatively, the lever 310 itself may trigger the sensor 325. The sensing material (when present) is also located at a height such that it passes over the proximity sensor when the tip of the lever 310 is engaged by the rack 305 and moves through a distance 2($x_o$). The sensor 325 is triggered anytime the lever is within the sensing range (s) of the sensor. A benefit of this configuration is that the lever length (L) and the initial lever position ($x_o$) can be designed so that very small displacements of the rack 305 will trigger the proximity sensor 325 and reset the damper, thereby allowing for energy to be released and then quickly stored again each time the rack changes direction.

While certain exemplary embodiments of the present invention are described in detail above, the scope of the invention is not to be considered limited by such disclosure. Rather, modifications are possible without departing from the spirit of the invention. For example, the grooved or toothed rack elements shown and described herein may be replaced with another type of actuator that simply includes a lever contacting surface of sufficiently high friction to displace the lever as described. Another, non-limiting modification, may include the use of a programmable valve that would remain open for a set amount of time once opened, regardless of vibration characteristics. RSPSD embodiments according to the invention may also have uses outside the field of structural control. For example, such other uses may include, without limitation, vehicle suspensions and aircraft landing gear.

What is claimed is:

1. A resetting semi-passive stiffness damper (RSPSD), comprising:
   a reciprocatable piston located within a cylinder;
   a linearly displaceable grooved rack coupled at one end to the piston;
   an actuator coupled between a structure to be damped and an opposite end of the grooved rack;
   a triggering assembly, the triggering assembly comprising:
      a displaceable, spring-loaded lever arranged between the grooved rack and a slotted channel residing above the grooved rack, a first end of the lever in contact with the grooved rack and a second end of the lever movably residing in the channel, and
      a sensor residing in the channel and located and adapted to detect the lever when the second end of the lever reaches a predetermined position within the channel, and to resultantly transmit an electrical valve open signal upon detection of the lever; and
   a bypass valve associated with the cylinder and in communication with the sensor of the triggering assembly, the bypass valve adapted to receive the electrical valve open signal from the sensor and to open in response thereto.

2. The RSPSD of claim 1, wherein vertical travel of the lever in the channel is related to the travel distance of the rack by a formula written as:

$$y(t)=\sqrt{L^2-[x_0-x(t)]^2}-(L-d)$$

where L is the length of the lever, $x_0$ is the distance between the slotted channel and a contact point of the lever with the rack, x(t) is the distance of movement of the rack and the first end of the lever, d is the total vertical travel distance of the lever within the slotted channel, and y(t) is valid for 0<x(t)<2($x_0$).

3. The RSPSD of claim 2, wherein the bypass valve is closed while the lever position satisfies the formula y(t)<s, where s is the vertical distance the lever must travel within the slotted channel to be within the sensing range of the sensor.

4. The RSPSD of claim 2, wherein when the lever reaches a position where s≤y(t)<d, the bypass valve will open, the pressure in the RSPSD will equalize, and the damper force will drop to zero.

5. The RSPSD of claim 4, wherein the bypass valve will remain open until the lever moves to a position that satisfies the formula y(t)<s.

6. The RSPSD of claim 2, wherein pressure equalization will take place while 0<x(t)<2($x_0$) and s≤y(t)<d.

7. The RSPSD of claim 1, further comprising a lever return spring located within the slotted channel, the lever return spring adapted to bias the lever toward the grooved rack.

8. The RSPSD of claim 1, wherein the sensor of the triggering assembly is further adapted to transmit an electrical valve close signal when the sensor does not detect the lever.

9. The RSPSD of claim 1, wherein the sensor is a proximity sensor.

10. The RSPSD of claim 1, wherein:
   a back-and-forth movement of the grooved rack will cause a reciprocating movement of the second end of the lever within the slotted channel; and
   wherein the reciprocating movement of the second end of the lever within the slotted channel will cause the sensor of the triggering assembly to repeatedly open and close the bypass valve to accordingly transfer energy between the structure to be damped and the RSPSD.

11. A resetting semi-passive stiffness damper (RSPSD), comprising:
   a reciprocatable piston located within a cylinder;

a linearly displaceable grooved rack coupled at one end to the piston;

an actuator coupled between a structure to be damped and an opposite end of the grooved rack;

a triggering assembly, the triggering assembly comprising:

a displaceable lever arranged between the grooved rack and a slotted channel residing above the grooved rack, a first end of the lever in contact with the grooved rack and a second end of the lever movably residing in the channel and in contact with a return spring located therein, and a sensor residing in the channel and located and adapted to detect the lever when the second end of the lever is within the sensing range of the sensor, the sensor further adapted to transmit a valve open signal upon detection of the lever and to transmit a valve close signal when the lever is outside the sensing range of the sensor; and a bypass valve associated with the cylinder and in communication with the sensor of the triggering assembly so as to receive the electrical open and close signals from the sensor and to open and close in response thereto.

12. The RSPSD of claim 11, wherein vertical travel of the lever in the channel is related to the travel distance of the rack by a formula written as:

$$y(t) = \sqrt{L^2 - [x_0 - x(t)]^2} - (L-d)$$

where L is the length of the lever, $x_0$ is the distance between the slotted channel and a contact point of the lever with the rack, x(t) is the distance of movement of the rack and the first end of the lever, d is the total vertical travel distance of the lever within the slotted channel, and y(t) is valid for $0 < x(t) < 2(x_0)$.

13. The RSPSD of claim 12, wherein the bypass valve is closed while the lever position satisfies the formula $y(t) < s$, where s is the vertical distance the lever must travel within the slotted channel to be within the sensing range of the sensor.

14. The RSPSD of claim 12, wherein when the lever reaches a position where $s \leq y(t) < d$, the bypass valve will open, the pressure in the RSPSD will equalize, and the damper force will drop to zero.

15. The RSPSD of claim 14, wherein the bypass valve will remain open until the lever moves to a position that satisfies the formula $y(t) < s$.

16. The RSPSD of claim 12, wherein pressure equalization will take place while $0 < x(t) < 2(x_0)$ and $s \leq y(t) < d$.

17. The RSPSD of claim 11, wherein the sensor is a proximity sensor.

18. The RSPSD of claim 11, wherein:

a back-and-forth movement of the grooved rack will cause a reciprocating movement of the second end of the lever within the slotted channel; and wherein the reciprocating movement of the second end of the lever within the slotted channel will cause the sensor of the triggering assembly to repeatedly open and close the bypass valve to accordingly transfer energy between the structure to be damped and the RSPSD.

* * * * *

UNITED STATES PATENT AND TRADEMARK OFFICE
CERTIFICATE OF CORRECTION

| | |
|---|---|
| PATENT NO. | : 9,598,862 B2 |
| APPLICATION NO. | : 14/106185 |
| DATED | : March 21, 2017 |
| INVENTOR(S) | : Walsh |

It is certified that error appears in the above-identified patent and that said Letters Patent is hereby corrected as shown below:

In the Specification

Column 1, Line 9 (approx.), under the section heading "STATEMENT REGARDING FEDERALLY SPONSORED RESEARCH OR DEVELOPMENT" -- please remove "grant No. 1235373" and replace it with "grant No. 1235273".

Signed and Sealed this
Fourteenth Day of May, 2019

Andrei Iancu
*Director of the United States Patent and Trademark Office*